(12) United States Patent
Rudnik et al.

(10) Patent No.: US 7,728,870 B2
(45) Date of Patent: Jun. 1, 2010

(54) ADVANCED QUALITY MANAGEMENT AND RECORDING SOLUTIONS FOR WALK-IN ENVIRONMENTS

(75) Inventors: Eyal Rudnik, Ramat Gan (IL); Ilan Freedman, Petach Tikva (IL); Yoel Goldenberg, Ramat Hasharon (IL)

(73) Assignee: Nice Systems Ltd, Ra'Anana (IL)

( * ) Notice: Subject to any disclaimer, the term of this patent is extended or adjusted under 35 U.S.C. 154(b) by 985 days.

(21) Appl. No.: 10/831,136

(22) Filed: Apr. 26, 2004

(65) Prior Publication Data

US 2005/0015286 A1 Jan. 20, 2005

Related U.S. Application Data

(63) Continuation-in-part of application No. 10/488,686, filed as application No. PCT/IL02/00741 on Sep. 5, 2002, now abandoned.

(60) Provisional application No. 60/317,150, filed on Sep. 6, 2001.

(51) Int. Cl.
H04N 7/18 (2006.01)
H04N 5/225 (2006.01)

(52) U.S. Cl. .............. 348/143; 348/207.1; 348/207.11; 348/211.5; 348/222.1; 348/231.4

(58) Field of Classification Search .................. 348/143
See application file for complete search history.

(56) References Cited

U.S. PATENT DOCUMENTS

| | | | |
|---|---|---|---|
| 4,145,715 A | 3/1979 | Clever | |
| 4,821,118 A | 4/1989 | Lafreniere | |
| 5,091,780 A | 2/1992 | Pomerleau | |
| 5,303,045 A | 4/1994 | Richards et al. | |
| 5,307,170 A | 4/1994 | Itsumi et al. | |
| 5,353,618 A | 10/1994 | Crick | |
| 5,404,170 A | 4/1995 | Keating | |
| 5,519,446 A | 5/1996 | Lee | |
| 5,666,157 A * | 9/1997 | Aviv | ........................... 348/152 |
| 5,734,441 A | 3/1998 | Kondo et al. | |
| 5,742,349 A | 4/1998 | Choi et al. | |
| 5,790,096 A | 8/1998 | Hill, Jr. | |
| 5,796,439 A | 8/1998 | Hewett et al. | |

(Continued)

FOREIGN PATENT DOCUMENTS

DE    103 58 333 A1    7/2005

(Continued)

OTHER PUBLICATIONS

NiceVision—Secure your Vision, a prospect by NICE Systems, Ltd., Dec. 2001.

(Continued)

*Primary Examiner*—Ngoc-Yen T Vu
(74) *Attorney, Agent, or Firm*—Ohlandt, Greeley, Ruggiero & Perle, L.L.P.

(57) ABSTRACT

A system and method for capturing, logging and retrieval of face-to-face interactions characterizing walk-in environments. The system comprising a device for capturing and storing one or more face to face interactions captured in the presence of the parties to the interaction, and a database for storing data and metadata information associated with the face-to-face interactions captured.

52 Claims, 9 Drawing Sheets

U.S. PATENT DOCUMENTS

| | | | |
|---|---|---|---|
| 6,014,647 A | 1/2000 | Nizzar et al. | |
| 6,028,626 A | 2/2000 | Aviv et al. | |
| 6,037,991 A | 3/2000 | Thro et al. | |
| 6,070,142 A | 5/2000 | McDonough et al. | |
| 6,072,522 A * | 6/2000 | Ippolito et al. | 348/14.1 |
| 6,081,606 A | 6/2000 | Hansen et al. | |
| 6,092,197 A | 7/2000 | Coueignoux | |
| 6,094,227 A | 7/2000 | Guimier | |
| 6,097,429 A | 8/2000 | Seeley et al. | |
| 6,111,610 A | 8/2000 | Faroudja | |
| 6,122,239 A * | 9/2000 | Bodo et al. | 711/111 |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,212,178 B1 | 4/2001 | Beck | |
| 6,230,197 B1 | 5/2001 | Beck et al. | |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,377,995 B2 * | 4/2002 | Agraharam et al. | 709/231 |
| 6,404,857 B1 | 6/2002 | Blair et al. | |
| 6,404,925 B1 * | 6/2002 | Foote et al. | 382/224 |
| 6,427,137 B2 | 7/2002 | Petrushin | |
| 6,441,734 B1 | 8/2002 | Gutta et al. | |
| 6,559,769 B2 | 5/2003 | Anthony et al. | |
| 6,567,787 B1 * | 5/2003 | Walker et al. | 705/16 |
| 6,580,360 B1 * | 6/2003 | McKee et al. | 340/286.09 |
| 6,704,409 B1 | 3/2004 | Dilip et al. | |
| 6,867,799 B2 * | 3/2005 | Broemmelsiek | 348/169 |
| 6,894,714 B2 * | 5/2005 | Gutta et al. | 348/14.07 |
| 6,894,987 B1 * | 5/2005 | Andersen et al. | 370/261 |
| 6,973,437 B1 * | 12/2005 | Olewicz et al. | 705/15 |
| 7,015,945 B1 * | 3/2006 | Sullivan | 348/150 |
| 7,076,427 B2 | 7/2006 | Scarano et al. | |
| 7,116,357 B1 * | 10/2006 | Oya et al. | 348/211.8 |
| 7,304,662 B1 * | 12/2007 | Sullivan et al. | 348/150 |
| 7,305,082 B2 * | 12/2007 | Elazar et al. | 379/265.07 |
| 7,383,200 B1 * | 6/2008 | Walker et al. | 705/10 |
| 2001/0043697 A1 | 11/2001 | Cox et al. | |
| 2002/0005898 A1 | 1/2002 | Kawada et al. | |
| 2002/0010705 A1 | 1/2002 | Park et al. | |
| 2002/0059283 A1 | 5/2002 | Shapiro et al. | |
| 2002/0087385 A1 | 7/2002 | Vincent | |
| 2003/0059016 A1 | 3/2003 | Lieberman et al. | |
| 2003/0128099 A1 | 7/2003 | Cockerham | |
| 2003/0163360 A1 | 8/2003 | Galvin | |
| 2004/0080610 A1 * | 4/2004 | James et al. | 348/14.09 |
| 2004/0098295 A1 | 5/2004 | Sarlay et al. | |
| 2004/0141508 A1 | 7/2004 | Schoeneberger et al. | |
| 2004/0249650 A1 | 12/2004 | Freedman et al. | |
| 2005/0030374 A1 * | 2/2005 | Goldenberg et al. | 348/143 |
| 2008/0063179 A1 * | 3/2008 | Elazar et al. | 379/265.09 |

FOREIGN PATENT DOCUMENTS

| | | |
|---|---|---|
| EP | 1 484 892 A2 | 8/2004 |
| GB | 9916430.3 | 7/1999 |
| WO | WO 95 29470 A | 11/1995 |
| WO | WO 98 01838 A | 1/1998 |
| WO | WO 02/37856 | 5/2002 |
| WO | WO 03 013113 A2 | 2/2003 |
| WO | WO 03 067360 A2 | 8/2003 |
| WO | WO 03 067884 A1 | 8/2003 |
| WO | WO 2004/091250 | 10/2004 |

OTHER PUBLICATIONS

NICE Systems announces New Aviation Security Initiative, reprinted from Security Technology & Design, Dec. 2001.

(Hebrew) "the Camera That Never Sleeps" from Yediot Aharonot, Oct. 11, 2002.

Freedman, I. Closing the Contact Center Quality Loop with Customer Experience Management, Customer Interaction Solutions, vol. 19, No. 9, Mar. 2001.

PR Newswire, NICE Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

SEDOR—Internet pages form http://www.dallmeier-electronic.com, May 2003.

(Hebrew) print from Haaretz, "The Computer at the Other End of the Line", Feb.17, 2002.

Q. Chen et al., A Data-Warehouse/OLAP Framework for Scalable Telecommunication Tandem Traffic Analysis, qchen,mhsu,dayal@hpl.hp.com, 2000; ICDE—2000; pp. 201-210.

Sertainty, Automated Quality Monitoring—SER Solutions, Inc. , 21680 Ridgetop Circle Dulles, VA, www.ser.com, 2003.

Sertainty, Agent Performance Optimization—SER Solutions, Inc., 2005 SE Solutions, Inc., www.ser.com.

Lawrence P. Mark, White Paper—Sertainty Automated Quality Assurance, 2003-2005, SER Solutions, Inc., 2005 SE Solutions, Inc., www.ser.com.

Douglas A. Reynolds, et al., Robust Text-Independent Speaker Identification Using Gaussian Mixture Speaker Models, Jan. 1995, 70 pp. 72-83, vol. 3, No. 1, IEEE Transactions on Speech and Audio Processing.

Upendra V. Chaudhari, et al., Very Large Population Text-Independent Speaker Identification Using Transformation Enhanced Multi-Grained Models, IBM T.J. Research Center, Rt. 134, Yorktown Heights, NY 10598. email: uvc@us.ibm.com, 2001; ICASSP—2001.

Douglas A. Reynolds, et al., Speaker Verification Using Adapted Gaussian Mixture Models, Digital Signal Processing, Jan./Apr./Jul. 2000, pp. 19-41, vol. 10, Nos. 1-3, M.I.T. Lincoln Laboratory, 244 Wood St., Lexington, Massachusetts 02420, email: dar@sst.II.mit.edu.

Yaniv Zigel, et al., How to Deal with Multiple-Targets in Speaker Identification Systems?, Nice Systems Ltd., Audio Analysis Group, P.O.B. 690 Ra'anana 43107, Israel yanivz@nice.com, Oct. 2000.

Frederic Bimbot, et al., A Tutorial on Text-Independent Speaker Verification, EURASIP Journal on Applied Signal Processing, Aug. 8, 2003, pp. 430-451, Hindawi Publishing Corporation.

Yeshwant K.Muthusamy, et al., Reviewing Automatic Language Identification, IEEE Signal Processing Magazine, Oct. 1994, pp. 33-41.

Marc A. Zissman, Comparison of Four Approaches to Automatic Language Identification of Telephone Speech, IEEE Transactions on Speech and Audio Processing, Jan. 1996, pp. 31-44, vol. 4, No. 1.

N. Amir S. Ron, Towards an Automatic Classification of Emotions in Speech, Communications Engineering Department Center for Technological Education Holon 52 Golomb st. Holon 58102, Isreal, naomoto@wine.chet.ac.il, 1998.

* cited by examiner

ADVANCED QUALITY MANAGEMENT AND RECORDING SOLUTIONS FOR WALK-IN ENVIRONMENTS

RELATED APPLICATIONS

The present invention is a continuation-in-part of U.S. application Ser. Nos. 10/488,686 which was the national stage of International Application No. PCT/IL02/00741, filed 5 Sep. 2002, now abandoned, which claims the benefit of 60/317,150 filed Sep. 6, 2001.

The present invention discloses a new method and system for capturing, storing, retrieving face-to-face interactions for the purpose of quality management in Walk-in environment.

The present invention relates to PCT patent application serial number PCT/IL02/00197 titled A METHOD FOR CAPTURING, ANALYZING AND RECORDING THE CUSTOMER SERVICE REPRESENTATIVE ACTIVITIES filed 12 Mar. 2002, and to PCT patent application serial number PCT/IL02/00796 titled SYSTEM AND METHOD FOR CAPTURING BROWSER SESSIONS AND USER ACTIONS filed 24 Aug. 2001, and to U.S. patent application Ser. No. 10/056,049 titled VIDEO AND AUDIO CONTENT ANALYSIS SYSTEM filed 30 Jan. 2001, and to U.S. provisional patent application Ser. No. 60/354,209 titled ALARM SYSTEM BASED ON VIDEO ANALYSIS filed 6 Feb. 2002, and to PCT patent application serial number PCT/IL02/00593 titled METHOD, APPARATUS AND SYSTEM FOR CAPTURING AND ANALYZING INTERACTION BASED CONTENT filed 18 Jul. 2002.

BACKGROUND OF THE INVENTION

1. Field of the Invention

The present invention relates to capturing, storing, and retrieving synchronized voice, screen and video interactions, in general and to advanced methods for recording interactions for Customer Experience Management (CEM) and for quality management (QM) purposes, in particular.

2. Discussion of the Related Art

A major portion of the interaction between a modern business and its customers are conducted via the Call Center or Contact Center. These somewhat overlapping terms relate to a business unit which manages and maintains interactions with the business' customers and prospects, whether via means of phone in the case of the Call Center and/or through computer-based media such as e-mail, web chat, collaborative browsing, shared whiteboards, Voice over IP (VOIP), etc. These electronic media have transformed the Call Center into a Contact Center handling not only traditional phone calls, but also complete multimedia contacts. Recording digital voice, data and sometimes video is common practice in Call Centers and Contact Centers as well as in trading floors and in bank branches. Such recordings are typically used for compliance purposes, when such recording of the interactions is required by law or other means of regulation, risk management, limiting the businesses' legal exposure due to false allegations regarding the content of the interaction or for quality assurance using the re-creation of the interaction to evaluate an agent's performance. Current systems are focused on recording phone calls such as Voice, VoIP and computer based interactions with customers such as e-mails, chat sessions, collaborative browsing and the like, but are failing to address the recording of the most common interactions, those done in walk-in environments where the customer has a frontal, face-to-face, interaction with a representative. This solution refers to any kind of frontal, face to face point of sale or service from service centers through branch banks, fast food counters and the like. Present systems do not provide the ability to use a recording device in a walk-in environment. The basis for a recording of an interaction includes an identified beginning and end. Phone call, email handling and web collaboration sessions all have a defined beginning and end that can be identified easily. Furthermore, most technological logging platforms enable the capturing of interactions and thus are able to provide additional information about the interaction. In frontal center there are no means of reporting of beginning and end of interactions, nor the ability to gain additional information about the interaction that would enable one to associate this "additional information" to it and to act on it. In referring to "additional information" we refer to information such as indication concerning the customer's identity, how long the customer has been waiting in line to be served, what service the customer intended to discuss when reaching the agent, and the like. Such information is readily available and commonly used in recording phone calls and can be obtained by CTI (Computer Telephony Integration) information or CDR/SMDR (Call Detail Reporting/Station Message Details Recording) connectivity. The walk-in environment is inherently characterized by people seeking service that come and leave according to a queue and there is no enabling platform for the communication. Additional aspect of the problem is the fact that the interaction in a walk-in environment has a visual aspect, which currently does not typically exist in remote communications discussed above. The visual, face-to-face interaction between agents and customers or others is important in this environment and therefore should be recorded too. The present solution deals with the described problems by solving the obstacles presented, providing a method for face-to-face recording, storing and retrieval, organization will be able to provide solutions to enforce quality management, exercise business analytic techniques and as direct consequence enhance quality of services in its remote branches. The accurate assessment of the quality of the agent's performance is quite important. The person skilled in the art will therefore appreciate that there is therefore a need for a simple new and novel method for capturing and analyzing Walk-in, face-to-face interaction for quality management purposes.

SUMMARY OF THE PRESENT INVENTION

It is an object of the present invention to provide a novel method and system for capturing, logging and retrieving face-to-face (frontal) interactions for the purpose of further analysis, by overcoming known technological obstacles characterizing the commonly known "Walk-in" environments.

In accordance with the present invention, there is thus provided a system for capturing face-to-face interaction comprising interaction capturing and storage unit, microphones (wired or wireless) devices located near the parties interacting and optionally one (or more) video camera. The system interaction capture and storage unit further comprises of at least a voice capture, storage and retrieval component and optionally a screen capture and storage component for screen shot and screen events interaction capturing, storing and retrieval, video capture and storage component for capturing, storing and retrieval of the visual streaming video interaction. In addition a database component in which information regarding the interaction is stored for later analysis is required, non-limiting example is interaction information to be evaluated by team leaders and supervisors. The database holds additional metadata related to the interaction and any information gathered from external source, non-limiting example is information gathered from a 3$^{rd}$ party such as from Customer Relationship Management (CRM) application, Queue Management System, Work Force Management Application and the like. The database component can be an SQL database with drivers used to gather this data from surrounding databases and components and insert this data into the database.

In accordance with the present invention a variation system would be a system in which the capture and storage elements are separated and interconnected over a LAN/WAN or any other IP based network. In such an implementation the capture component is located at the location at which the interaction takes place. The storage component can either be located at the same location or be centralized at another location covering multiple walk-in environments (branches). The transfer of content (voice, screen or other media) from the capture component to the storage component can either be based on proprietary protocols such as but not limiting to a unique packaging of RTP packets for the voice or based on standard protocols such as H.323 for VoIP.

In accordance with the present invention, there is also provided a method for collecting or generating information in a CTI less or CDR feed less "walk-in" environment for separating the media stream into interactions representing independent customer interactions and for generating additional data known as metadata describing the call. The metadata typically, provides additional data to describe the interactions entry in the database of recorded interactions enabling fast location of a specific interaction and to derive recording decisions and flagging of interactions based on this data (a non-limiting example is a random or rule based selection of interaction to be recorded or flagged for the purpose of quality management).

In accordance with one aspect of the present invention there is provided an apparatus for capturing, storing and retrieving face-to-face interactions in walk-in environments for the purpose of further analysis, the apparatus comprising a device for capturing and storing at least one face to face interaction captured in the presence of the parties to the interaction; and a database for storing data and metadata information associated with the face-to-face interaction captured. The device for capturing the at least one interaction comprises a microphone for obtaining interaction audio and for generating signals representative of the interaction audio and for relaying the signals representative of the interaction audio to a telephone line; a device connected between the microphone and a telephone line for gain and impedance matching and for detecting an on-hook state and an off-hook state of a telephone handset associated with the telephone line; and a voice capture and storage unit connected to the telephone line for capturing voice represented by the analog signals and for storing the captured voice. The voice capture and storage unit can further comprise a voice operated switch for minimizing interference when no interaction recording is taking place and for triggering energy-driven voice recording. The apparatus can further comprise a digital unit connected between the microphone and the telephone line for converting analog signals representative of the interaction audio to digital signals and for transmitting the converted digital signals to the telephone line in a pre-defined time slot when an associated telephone handset is in on-hook state, and for discarding the converted digital signals or mixing the converted digital signals with digital signals from the telephone handset when the associated telephone handset is in off-hook state. The apparatus can further comprise a camera having pan-tilt-zoom adjustment actuators and controlled by a camera selector mechanism and linked to an on-line pant-tilt-zoom adjustment control mechanism, installed in pre-defined locations configured to provide visual covering of a physical service location holding a potentially recordable interaction; a list of physical service locations associated with the camera; and a camera selector mechanism for determining the status of the camera and for selecting a camera to cover the physical service location. The apparatus further comprises a pan-tilt-zoom parameter associated with the physical service location for providing a pan-tilt-zoom adjustment parameter value. The pan-tilt-zoom parameter comprises the spatial definition of the physical service location. The pan-tilt-zoom adjustment parameter comprises the movement required to change the camera's position, tilt or pan to allow capture of the at least one physical service location. The camera selector can de-assign the camera from the physical service location. The device for capturing and storing comprises a frequency division multiplexing unit for receiving signals representing interaction data from the interaction input device and for multiplexing the input signals and for transmitting the multiplexed signals to a capture and storage unit.

The device for capturing and storing can further comprise a computing device having two input channels for receiving interaction video from one or more cameras and for relaying the interaction video from the two cameras to a processor unit. The device for capturing and storing can also comprise a voice sampler data device associated with an interaction participant for identifying the interaction participant by comparing the captured voice of the participant with the voice sampler data. The device for capturing and storing can also comprises a volume detector device located at an interaction location and for detecting the presence of an interaction participant and the absence of an interaction participant. The detecting the presence or the absence of an interaction participant, provides interaction beginning determination and interaction termination determination. The apparatus further comprises an audio content analyzer applied to a recording plurality of interactions for segmenting the recording plurality of interactions into separate interactions or segments. The audio content analyzer identifies a verbal phrase or word characteristic to the beginning portion of an interaction or segment, said verbal phrase or word is defined as the beginning of the interaction or segment. The audio content analyzer identifies a verbal phrase or word characteristic to the ending portion of an interaction or segment, said verbal phrase or word is defined as the termination point of the interaction or segment.

The device for capturing and storing can also comprise an audio content analyzer applied to a recording of an interaction for identifying the interaction participants; an audio processing unit connected to the interaction input device for generating a digital representation of the voices of the interaction participants; and an audio filtering unit applied to the recording of the interaction for eliminating the ambient noise from the interaction recording.

The device for capturing and storing can also comprise a first audio input device associated with a customer service representative for capturing a first interaction audio data generated during a face-to-face interaction; a second audio input device associated with a customer for capturing a second interaction audio data generated during a face-to-face interaction; and a computing device for receiving the interaction audio data captured by the first and second audio input devices, and for identifying the interaction participants by comparing the first and second interaction audio data generated during a face-to-face interaction with previously stored audio files. The computing device further comprises an audio processor for generating a representation for the audio relayed from the first and second audio input devices to be compared with previous audio files representative of the audio files generated previously by the participants.

The device for capturing and storing can also comprise two cameras installed at an interaction location having pan-tilt-zoom movement capabilities and linked to a pan-tilt-zoom adjustment controller for providing visual covering of the interaction area and for locating an object in the interaction location space and for tracking an object in the interaction location space; and one or more microphones installed at the interaction location for audio covering of the interaction area. The two cameras installed at an interaction location are connected to an object location and microphone controller unit for directing said cameras to a predetermined service location. The object location and microphone controller unit comprises a visual object locator and movement monitor for locating an object within the service location and for tracking said object within the service location and for controlling the capture of audio and video of an interaction associated with said object. The object location and microphone controller unit comprises a service location file, a camera location file and a microphone location file. The object location and microphone controller unit can comprise a camera controller for controlling said cameras, a microphone controller for controlling said microphone, and a microphone selector to select a microphone located adjacent or within the service location.

In accordance with yet another aspect of the present invention there is provided a method for metadata gathering in walk-in environments, the method comprising determining the beginning and ending of an interaction associated with a face-to-face interaction; and generating and storing data or metadata information associated with the face-to-face interaction captured. The method further comprises the steps of obtaining interaction audio by one or more microphones; generating signals representing the interaction audio; feeding the signals representing the interaction audio to a telephone line; detecting an on-hook state and an off-hook state of a telephone handset associated with the telephone line by an active unit installed between the at least one microphone and the telephone line; and relaying the signals from the active unit through the telephone line to a voice capture and storage unit. The voice capturing and voice storage is triggered by a voice operated switch associated with the voice capturing and storage unit. The method further comprises the steps of converting the analog signals representing interaction audio to digital signals by a digital unit connected between the at least one microphone and the telephone line; transmitting the converted digital signals to the telephone line in a pre-defined time slot; when the telephone handset associated with the telephone line in an on-hook state. The method further comprises the step of discarding the converted digital signals or mixing the converted digital signals with digital signals from the telephone handset when the telephone handset associated with the telephone line is in an off-hook state. The method further comprises the steps of obtaining a list of physical service positions associated with one or more camera; selecting a camera not in use and not out of order for the required record-on-demand task; loading pan-tilt-zoom parameters pertaining to the physical service position; and re-directing the spatially the view of the camera to the physical service position by the operation of the pan-tilt-zoom adjustment actuators. The method further comprises the steps of locating and selecting an in-use camera suitable for the performance of the recording-on-demand; and re-directing the view of the located camera toward the required physical service position through the operation of the pan-tilt-zoom actuators. The method further comprises the steps of relaying signals representing interaction data from one or more interaction input device to a frequency division multiplexing unit; and multiplexing the signals representing interaction data into a combined signal wherein signals associated with a specific interaction input device are characterized by being modulated into a pre-defined frequency band. The method further comprises the step of relaying two or more signals representing interaction video from two or more cameras via two or more input channels into a processing unit. The method further comprises the steps of searching a pre-recorded voice sample bank for the presence of a pre-recorded voice sample matching the interaction participant voice sample; matching the pre-recorded voice sample to the interaction participant voice sample; and obtaining the details of the interaction participant associated with the pre-recorded voice sample. The method further comprises the step of sampling interaction audio obtained by one or more microphones to obtain an interaction participant voice sample. The voice sample bank is preferably generated dynamically during the performance of an interaction consequent to the extraction of interaction audio associated with the interaction participant and by the integration of interaction participant-specific customer relationship management information.

The method further comprises the steps of detecting the presence and the absence of an interaction participant at a service location; and submitting a command to begin an interaction recording in accordance with the presence or absence of the interaction participant. The method can further comprise the steps of receiving a captured stream of interaction audio; identifying verbal phrases or words where the phrases and the words are characterized by the location thereof in the beginning portion of an interaction; identifying verbal phrases or words where the phrases and the words are characterized by the location thereof in the terminating portion of an interaction; and segmenting the recorded stream of the interaction audio into distinct separate identifiable interactions based on the characteristics of the identified verbal phrases. The method can also further comprise the step of identifying an interaction participant by determining who is the customer service representative from a previously provided voice file and the customer as the non-customer service representation or from the content of the interaction; generating a digital representation of the voice of the interaction participant; and eliminating ambient noise from the interaction recording consequent to the selective separation of the identified interaction participant voice. Finally, the method can comprise the steps of locating an object in an interaction location space by one or more cameras; tracking the located object in the interaction location space by the one or more camera; and generating microphone activation commands for the one or more microphone based on the tracked object location data provided by the at least one camera.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention is a continuation-in-part of U.S. application Ser. No. 10/488,686 which was the national stage International Application No. PCT/IL02/007412, filed 5 Sep. 2002, which claims benefit of U.S. Provisional Application No. 60/317,150 filed Sep. 6, 2001. The present invention disclosed a new methods and system for capturing, storing, retrieving face-to-face interactions for the purpose of quality management in Walk-in environment.

The proposed solution utilizes a set of recording and information gathering methods and systems, for creating a system solution for walk-in environments that will enable organizations to record retrieve and evaluate the frontal interactions with their customers. Such face-to-face interactions might be interactions that customers experience on a daily bases such as in fast food counters, banking, point of sale and the like.

Figure 1:
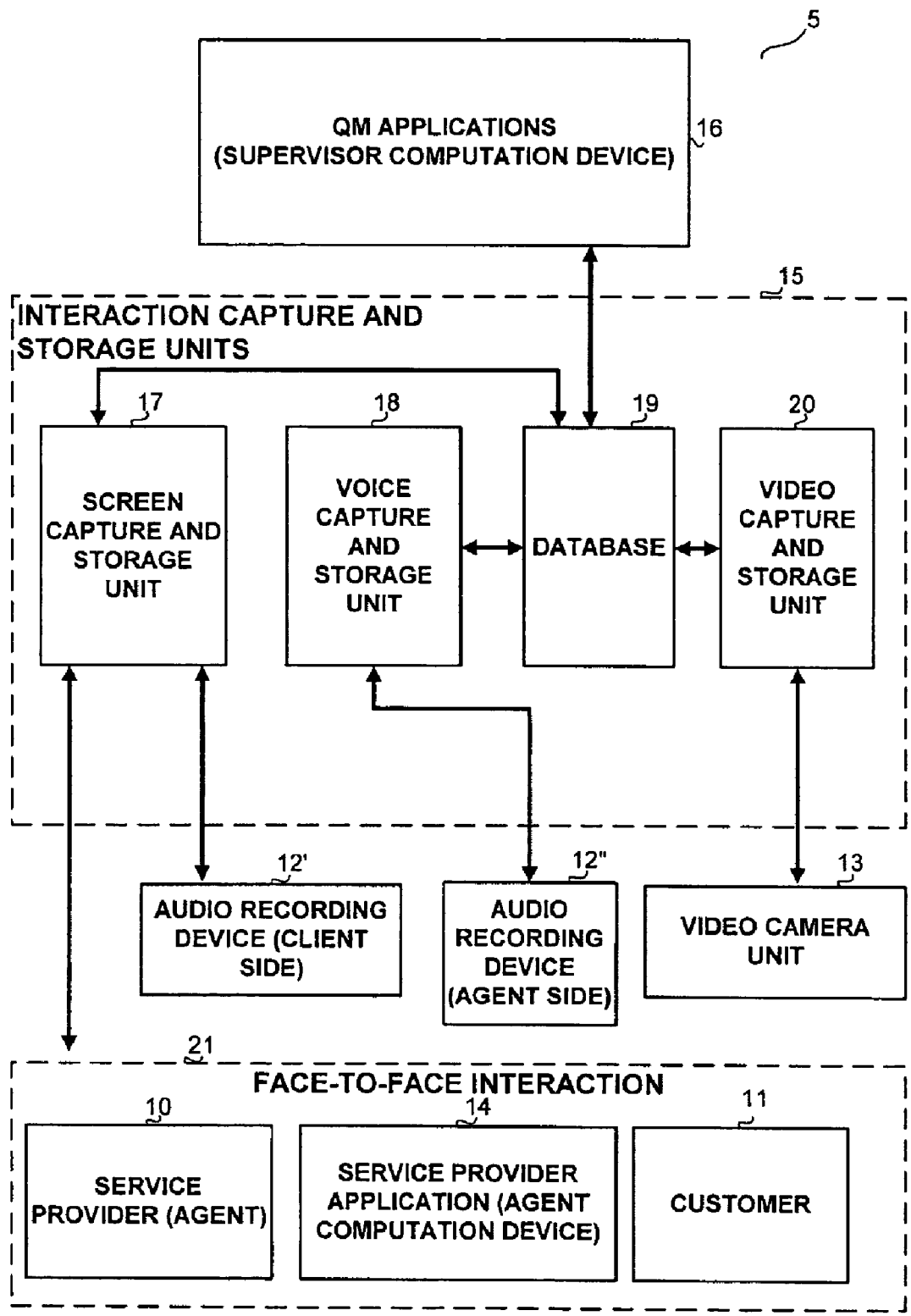
FIG. 1 is a schematic high-level diagram solution for walk-in centers, in accordance with a preferred embodiment of the present invention.

The present invention will be understood and appreciated from the following detailed description taken in conjunction with the drawing of FIG. 1 which is a high-level diagram solution for walk-in centers is shown. The system 5 describes a process flow, starting from the face-to-face interaction between parties and ending in an application that benefit from all the recorded, processed and analyzed information. The agent 10 and the customer 11 are representing the parties engaged in the interaction 21. Interaction 21 is candidate for further capture and evaluation. Interaction 21, in the context of the present embodiment, is any stream of information exchanged between the parties during face-to-face communication session whether voice captured by microphones, computer information captured by screen shots from the agent's workstation or visual gestures captured by video from cameras. The system includes interaction capture and storage unit 15 which includes at least one voice capture and storage component 18 for voice interaction capturing, storing and retrieval as a non-limiting example NiceLog by NICE Systems Ltd. of R'annana, Israel, and optionally one or more screen capture and storage components 17 for screen shot and screen events interaction capturing, storing and retrieval such as a non limiting example NiceScreen by NICE Systems Ltd. of Raanana, Israel, one or more video capture and storage component 20 for capturing, storing and retrieval of the visual streaming video interaction coming from one, or more, video camera 13, a non-limiting example such as NiceVision by NICE Systems Ltd., and a database component 19 in which information regarding the interaction is stored for later query and analysis as non-limiting example NicCLS by NICE Systems Ltd. of Raanana, Israel. A variant or alternative solution for the purpose of branch recording is where the capture and storage elements are separated and interconnected over a LAN/WAN or any other IP based local area or wide area network or other network. In such an implementation the capture component is located at the location at which the interaction takes place. Capture can be performed directly from the LAN/WAN. The storage component, which includes the database component 19, can either be located at the same location or be centralized at another location covering multiple walk-in environments or branches. The transfer of content voice, screen or other media from the capture component to the storage component can either be based on proprietary protocols such as a unique packaging of RTP packets for the voice or based on standard protocols such as H.323 for VoIP and the like. Persons skilled in the art will appreciate that the recording of the interaction can be performed directly from the packets transferred over the LAN/WAN by directly capturing the packets and recording such packets to a recording device.

In order to capture the voice, two or more audio recording devices 12', 12", such as omni-directional microphones, are installed such as to be directed to both side of the interaction, or to the agent 10, and the customer 11, respectively. Alternately, a single bi-directional or omni-directional microphone may be used. Persons skilled in the art will appreciate that any number of microphone devices may be used to capture the interaction, although for cost considerations one or two microphones would be the preferred embodiment. Once captured voice, screen and video recordings are stored in an Interaction capture and storage unit 15, the information is stored in a database 19 and may either be recreated for purposes such as dispute resolution or be further evaluated by team leaders and supervisors 16 using for example by the NiceUniverse application suite by NICE Systems Ltd. of Raanana, Israel. The suggested solution enables capturing of the interaction with microphones 12', 12" and video cameras 13 located in the walk-in service center. It should be noted that the video 20, voice 18 and the screen 17 capture and storage components are synchronized by continuously synchronizing their clocks using any time synchronization method for example by using as a non limiting example the NTP— Network Time Protocol or IRIG-B.

The capture of the interaction and its transfer to the interaction capture and storage unit 15 would typically require a personal computer or like computing device to be located at the location of capture. Such solution is provided in call centers. This personal computer is ordinarily equipped with a connection to the microphones 12', 12" and coverts the voice recorded into digital data via a modem device (not shown) and transfers the same to the voice capture and storage units 17, 18. In cases where the walk-in center representatives are not equipped with personal computers or like devices, the deployment of a walk-in center interaction capture system would be prohibitive since a new computer would have to be supplied to each representative. In addition, additional wiring installation would have to be installed normally at a significant cost.

Figure 2:
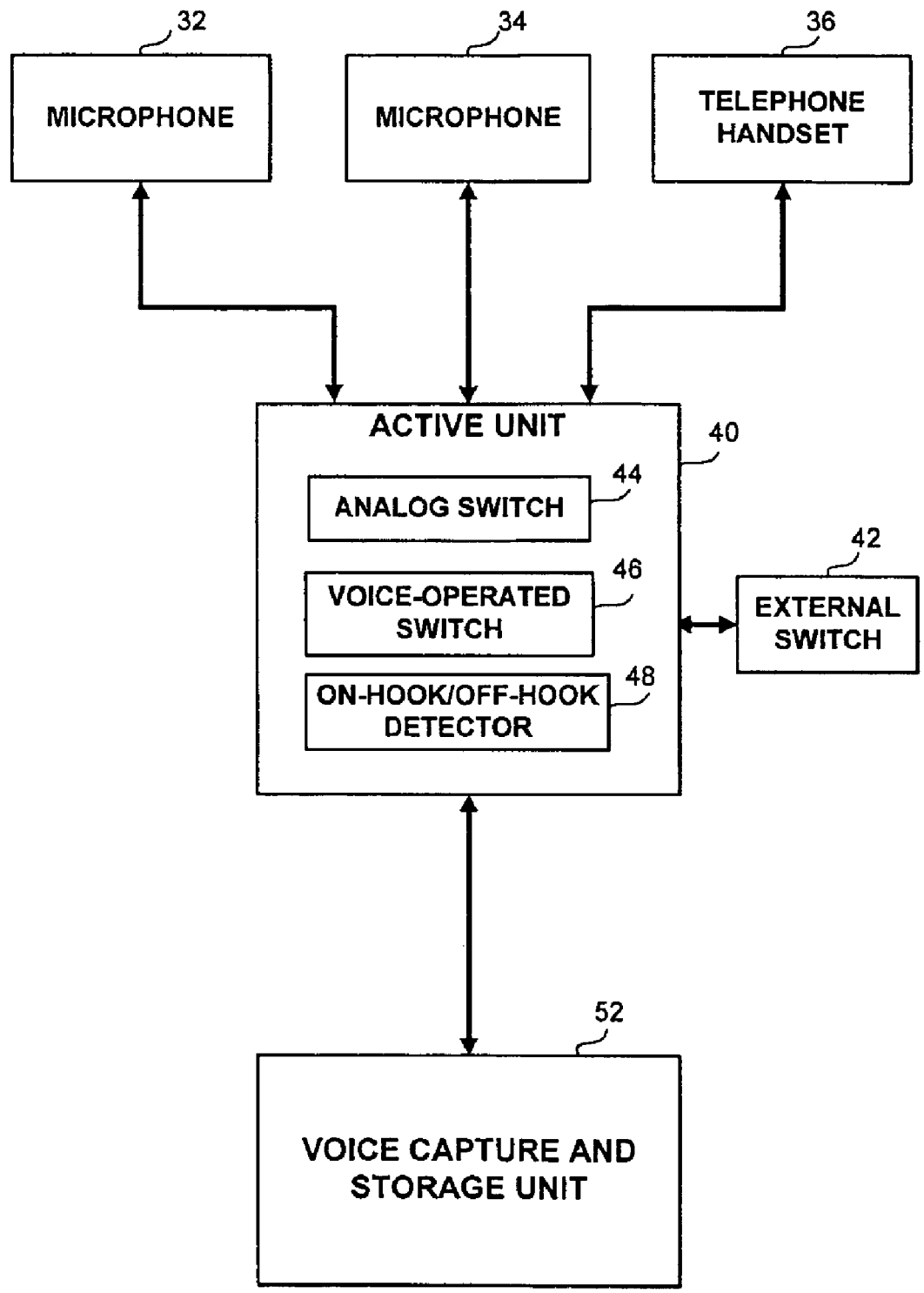
FIG. 2 is a schematic block diagram that describes the transfer of voice to the voice capture and storage unit via a telephone line.

Referring now to FIG. 2 showing the transfer of interaction audio from an interaction location to a voice capture and storage unit utilizing a telephone line. The present invention provides a simple and cheap solution that is shown in FIG. 2 by providing an active analog/digital unit 40 for relaying the capture of the interaction on existing telephone lines to the voice capture and storage unit 52. By using the device 40, an interaction can be captured and recorded without the need for new wiring, or new computer platforms to be installed at the walk-in center. For example, the installation and wiring of category 5 cables within some walk-in environments could be cost prohibitive and likewise the purchase of a new computer to every representative providing service, especially where telephones and telephone lines already exist.

FIG. 2 shows a first microphone device 32, a second microphone device 34, a telephone handset device 36, an active analog unit 40, an external switch 42, and a voice capture and storage unit 52. The active analog unit 40 is a simple box having input ports and output ports for receiving audio and sending audio or digital signals over the existing telephone lines. The active unit 40 preferably includes an analog switch 44, a voice-operated switch 46, and an on-hook/off-hook detector 48. The first microphone 32 obtains the voice of a first interaction participant, such as a customer service representative (CSR) during a face-to-face interaction, and the second microphone 36 obtains the voice of a second participant of the interaction, such as a customer, during the same face-to-face interaction. Other participants voices may be likewise captured. It is realistically assumed that the interaction location contains an at least one installed and operative telephone device including a handset linked via a phone line to a switch in order to provide standard telephony services. In the drawing under discussion the telephone handset 36 and the associated telephone line represent the operative telephone phone equipment typically installed at the interaction location. The telephone handset 36 and the associated telephone line is utilized, in addition to the provisioning of standard telephony services, for the transfer of voices obtained from the interaction participants during the face-to-face interaction. The telephone line linked to a standard telephony service switch that provides for the two-way transfer of telephone conversations between the first interaction participant (CSR) and diverse external callers. The installed telephone equipment is further used to transfer the voices obtained by the first microphone device 32 and the second microphone device 34 during the face-to-face interaction to the voice capture and storage unit 52 via the an active analog unit 40. Note should be taken that in an alternative configuration, the voices obtained during the face-to-face interaction are transferred from the microphone devices 32, 34 to the voice capture and storage unit 52 directly via a specifically installed wired communication path (not shown). The telephone could be an analog phone or a phone that uses a standard or proprietary digital protocol for the transfer of the voices from the handset to a phone switch (either a PBX or a PSTN). In environments where the phone is an analog-based device the output of a single microphone or the summed output of the pair of microphones 32, 34 is connected to the phone line using an active analog unit 40 for gain and impedance matching. The on-hook/off-hook detector 48 associated with the active analog unit 40 is responsible for the detection of "on-hook" and "off-hook" conditions of the telephone handset 36. Based on the position of the analog switch 44 associated with the analog unit the sound from the microphones 32, 34 could be disconnected. In environments where the telephone utilizes a standard or proprietary digital protocol in order to transfer voice, the active analog unit 40 is replaced by an active digital unit (not shown). The active digital unit (not shown) is used to convert the analog signal to a digital format generated by the phone handset 36 using an Analog to Digital unit (not shown). When the condition of the phone handset 36 is "on-hook" the active digital unit (not shown) transmits the converted voice in a time slot allocated to the transmission of voice from the telephone handset 36. When the condition of the phone handset 36 is "off-hook" the digital unit (not shown) could either discard the signal from the microphone devices 32, 34 and allow the signal from the telephone handset 36 to utilize the time slot thereof or could digitally mix the converted digital voice signal with the digital signal directed from the phone handset 36 to the switch. The external switch 42 is responsible for selecting which of the two alternative functions is performed. In addition, an energy-driven or voice operated switch (VOX)-driven detector 46 in the analog unit 40 is optionally employed to minimize interference with the phone line when no interaction is taking place at the interaction location. For both types of environments a standard voice logger, such as a NiceLog voice logger from NICE Systems Ltd is utilized as the voice capture and storage unit 52. The voice logger could include either an analog line interface or a digital line interface. The unit 52 is configured to discard on-hook and off-hook detection and trigger recording based on the true VOX or energy detection. Thus, even when the condition of the phone handset 36 is "off-hook" the sound signals produced by the microphones 32, 34 and transmitted to the voice logger over the phone line are recorded. For both types of environments the voice signals from the microphones 32, 34 are mixed with the voice signal form the phone handset 36. When the handset 36 is not in use ("on-hook" state) only the sound from the microphones 32, 34 is transmitted over the phone line. When the state of the handset 36 is "off-hook" the consequent mode of operation is controlled by the analog switch 44 or digital switch (not shown) associated with the analog unit 40 or digital unit (not shown) respectively. If the switch 40 is set to prevent the insertion of the sound from the microphones 32, 34 then only the sound from the phone conversation will be transmitted. In contrast, if the switch 40 is set to enable the insertion of the voice from the microphones 32, 34 even when the phone handset 36 is "off-hook" the line from the phone handset 36 to the switch will carry both the signal from the phone handset 36 and the signal from the microphones 32, 34. The result is that voice captured by microphones 32, 34 and telephone 36 is processed and stored for further processing in such environments lacking a personal computer and appropriate data cable wirings to enable the transfer of captured voice to a voice logger and storage.

Businesses operating in walk-in environments are often required or forced to visually record specific interactions "on-demand". Diverse reasons exist that necessitate the recording of a specific type of transactions or of the recording of transactions involving specific customers. Typically such reasons involve unlawful or extreme behavior from the part of the interaction participants. For example, a recording-on-demand could be initiated in order to verify the conduct of a transaction where a suspicion of potentially fraudulent behavior exists. A similar requirement could arise in case of potentially threatening, violent and malicious behavior. Even in ordinary settings recording of the interaction environment can be helpful for quality management and review of the interactions performed.

Providing effective visual recordings of an interaction requires the deployment of an at least one video camera in positions for which a potential recording-on-demand could be initiated. The massive deployment of separate dedicated video cameras in every potential "recording-on-demand" (ROD) position is substantially wasteful both financially and operatively.

Figure 3:
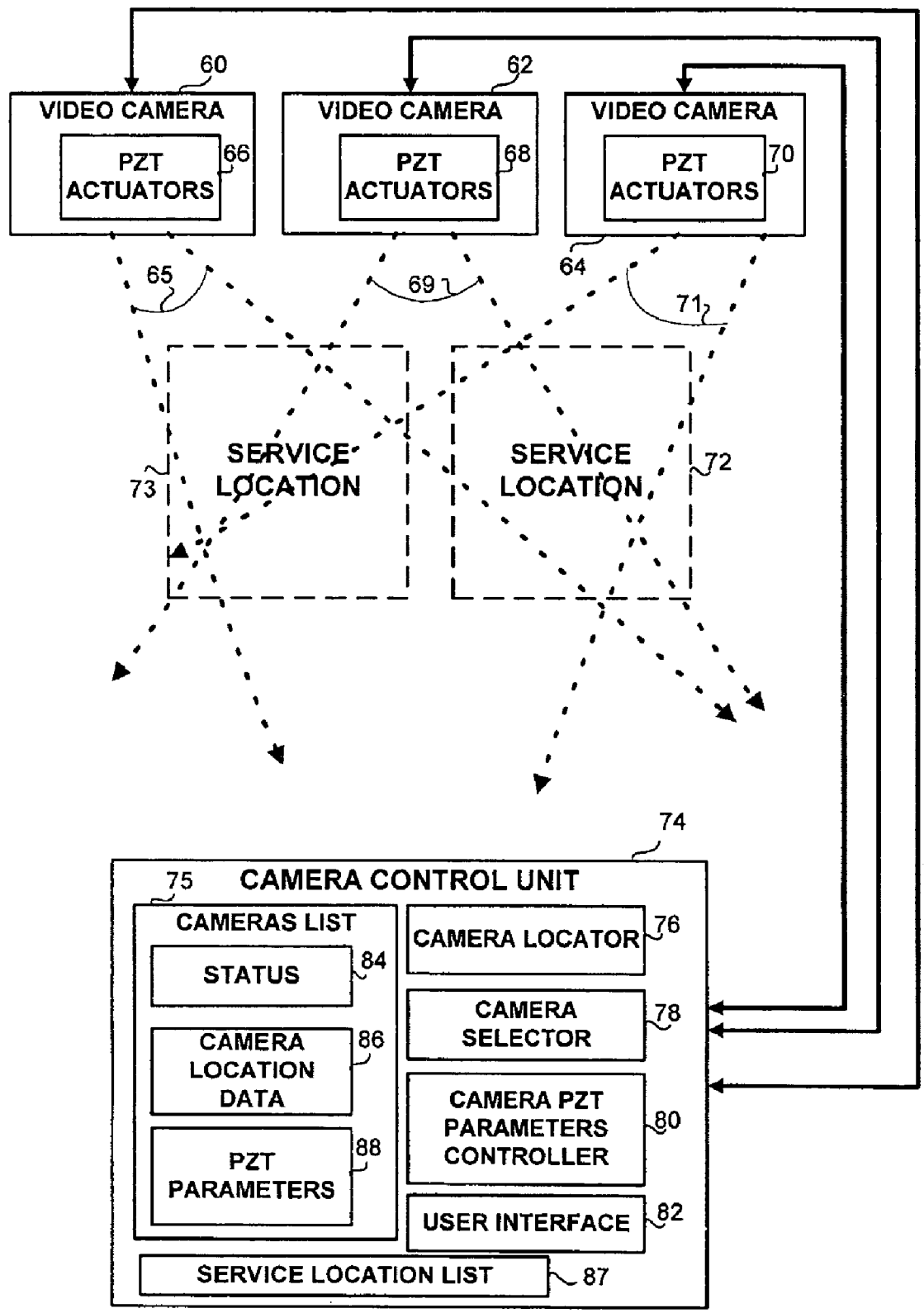
FIG. 3 is a schematic block diagram that describes recording-on-demand (ROD) and pan-tilt-zoom (PTZ) movement control of the video cameras.

To enable an ROD suitable environment one or more video cameras are deployed that can cover positions which would necessitate recording. In most walk-in environments security cameras can be connected to the system of the present invention to offer coverage without additional installations. One camera can be positioned to cover more than one representative or customer to conserve on purchase and installation costs. Referring now to FIG. 3 that shows the components in the execution of the recording-on-demand (ROD) option during a face-to-face interaction and the components operative in controlling the pan-tilt-zoom (PTZ) movement actuators of the video cameras. FIG. 3 includes a first video camera 60, a second video camera 62, a third video camera 64, and a camera control unit 74. One omni-directional or PTZ camera can replace a number or all of the cameras located within the space to be controlled or viewed. The number of PTZ cameras to be used depends on the area to be viewed and controlled. A single camera can be sufficient where the area to be monitored is small. In addition, panoramic cameras can be used in addition or as a replacement to regular cameras. Such panoramic cameras can be PTZ cameras or regular cameras and may provide directional as well as spatial information. One non-limiting example of a PZT camera is an elbex PTZ EXC90 dome camera, manufactured by Elbex, Sweden. The camera control unit 74 includes a cameras list 75, a camera locator 76, a camera selector 78, a camera PTZ parameters controller 80, a user interface 82, and service locations list 87. The cameras list 75 includes a set of camera records for the video cameras 60, 62, 64. The camera records include camera status 84, camera location data 86, and a set of PTZ parameter values 88. For a readier understanding of the system a first service location 73 and a second service location 72 are shown in the drawing under discussion where each service location is associated with a face-face interaction. The video cameras 60, 62, 64 are installed at pre-planned and pre-defined physical locations around the service locations 72, 73 such that one or more of the cameras 60, 62, 64 is capable of covering one or more service locations 72, 73. As noted above previously installed security cameras can be used in the context of thew present invention. The cameras 60, 62, 64 include the controllable pant-zoom-tilt (PTZ) adjustment actuators 66, 68, 70, respectively. The physical locations of the of cameras 60, 62, 64 in conjunction with the use of PTZ adjustment actuators 66, 68, 70 form a combined field-of-view that could substantially cover visually the entire set of service locations 72, 73, which are potentially required to be recorded on-demand. The pant-tilt-zoom (PTZ) adjustment actuators 66, 68, 70 could be operated either automatically or manually where the manual operation is performed by a user via the user interface 82. For each video camera 60, 62, 64, the system maintains a service locations list 87 that the cameras 60, 62, 64 are able to cover. Each entry in the service locations list 87 is associated with a suitable set of PTZ parameters 88. The PTZ parameters include the spatial definition of each service location 72, 73. When a record-on-demand (ROD) request is issued for a specific service location 72, 73 the camera locator 76 locates all the cameras that can potentially cover the required location. Next, the camera selector 78 will process the set of located cameras in order to select one of the operationally available cameras (the status 84 of which is both "not-in-use" and "not-out-of-order") for the required task through the operation of the camera selector 78. The operation of the camera selector 78 could be based on any of the known selection algorithms. Typically an algorithm would be used that minimizes future blocking potential. If the entire set of the cameras that are capable of covering the required service location 72, 73 are in current use then the system instructs one of the currently operating cameras to terminate its current task and re-directs the camera to the required task. When an available and capable camera is selected for the task, the PTZ parameters 88 pertaining to the required service location 72, 73 are loaded and the camera's view is spatially re-directed to the service location by suitably operating the PTZ actuators 66, 68, 70 via the camera PTZ parameters controller 80. When the camera turns toward the required service location a visual recording of the covered location is initiated. If no camera is available then interaction audio data could be recorded exclusively. The system automatically polls the set of cameras 60, 62, 64 until a suitable camera is located or a suitable camera is made available by de-assigning the camera from a current task. Consequently, the PTZ parameters 88 pertaining to the required service location 72, 73 are loaded and the camera is re-assigned to the required task. PTZ parameters are determined according to the physical PTZ values provided by the camera. Each PTZ camera can provide the physical parameters of its position and the position of its lenses. The combined parameters provided by the PTZ camera provide accurate three dimensional spatial information allowing the system using the camera name (or other identifying means such as PCT name, MAC address extension and the like) to associate a service location with a camera. Likewise, the camera can be provided with physical parameters which will be associated with spatial location at the service locations. As noted above, the system can use either a single camera or an arrays of cameras. The cameras may be bi directional or omni-directional, limited focus or panoramic. The camera or cameras may provide directional information from their physical orientation during use. Spatial coordinates can also be extracted from microphones (not shown) located in the area of the service location 72, 73 or there about. For example, one or more microphones may be attached to the ceiling above the service location 72, 73. When sound is received by said microphones, the input signal is provided to the camera control unit 74 wherein a voice controller unit (not shown) identifies the intensity of the audio signal. In case a number of microphones are installed the voice controller unit can transfer the camera PZT parameters controller 80 with the service location for which the video cameras 60, 62, 64 should be directed too as is described above by the cameras locator 76, camera selector 78 and the camera control unit 74. If one or more omni-directional microphones are installed the voice controller unit extrapolates the audio received and if an audio input from a particular service area is above a predetermined threshold then the spatial information of the audio source or the service location to be viewed is transferred to the camera control unit 74 so as to turn one or more cameras to the audio source so video feed can be captured with respect to the audio received which exceed predetermined threshold. The threshold may be the audio level or other aspects of the audio, such as stress in the voice captured over the audio feed, said stress to be detected by an audio analysis computer program (not shown). Additional examples of audio analysis which can be used are further detailed in U.S. patent application Ser. No. 10/056,049 titled VIDEO AND AUDIO CONTENT ANALYSIS SYSTEM filed 30 Jan. 2001 reference to which is hereby made. Persons skilled in the art will appreciate that a single or few cameras can be used in conjunction with a number of microphones whereby the cameras are directed towards service areas according to the result of the audio analysis. Thus, if the audio analysis suggests that a customer or a representative raise their voices, or speak about gifts, or illegal issues, the one or more cameras may be directed towards said service area to capture a video feed of the interaction. Such use of microphones reduces the need of a human operator to control the audio captured. The camera's view is spatially re-directed to the physical service location 72, 73 by suitable operation of the PTZ adjustment actuators 66, 68, 70 in accordance with the PTZ parameter values 88. Such values can include the movement values necessary to view and capture a physical service location 72, 73. When the camera turns toward the required physical service location 72, 73 the visual recording of the covered position is initiated. Note should be taken that in a manner similar to a typical recording-on-demand application, not all the users are capable of initiating and performing video recording simultaneously. The proposed solution enables a reduction in the required number of cameras due to the fact that service locations in walk-in environments are typically located in close proximity and therefore a single camera could be located such as to be able potentially to cover a plurality of service locations with different PTZ settings for each location. In order to decrease the probability of blocking additional cameras could be employed. A selective recording mode could be implemented in which the recording decision is taken by a rule engine instead of a user. The proposed solution could be operative in any other application requiring the sharing of cameras and camera resource management. Note should be taken that although on the drawing under discussion only a limited number of cameras and service locations are shown it would readily understood that in a realistic environment a plurality of cameras could be used covering a plurality of service locations.

In many walk-in environments, a many-to-one relationship exists between the number of business representatives (or service positions if applicable) and the number of computing platforms. The configuration where every interaction capture device or every pair of interaction capture devices is connected to a dedicated computing platform that converts the voice into a data stream and transfers said voice to a logging unit over a network is not feasible in an environment with a many-to-one relationship between the representatives and the computers. Hard-wiring each voice capture device or each pair of voice capture devices to an input of a voice logger is structurally complicated and could entail prohibitive costs due to the need for the extensive wiring installation.

Figure 4A:
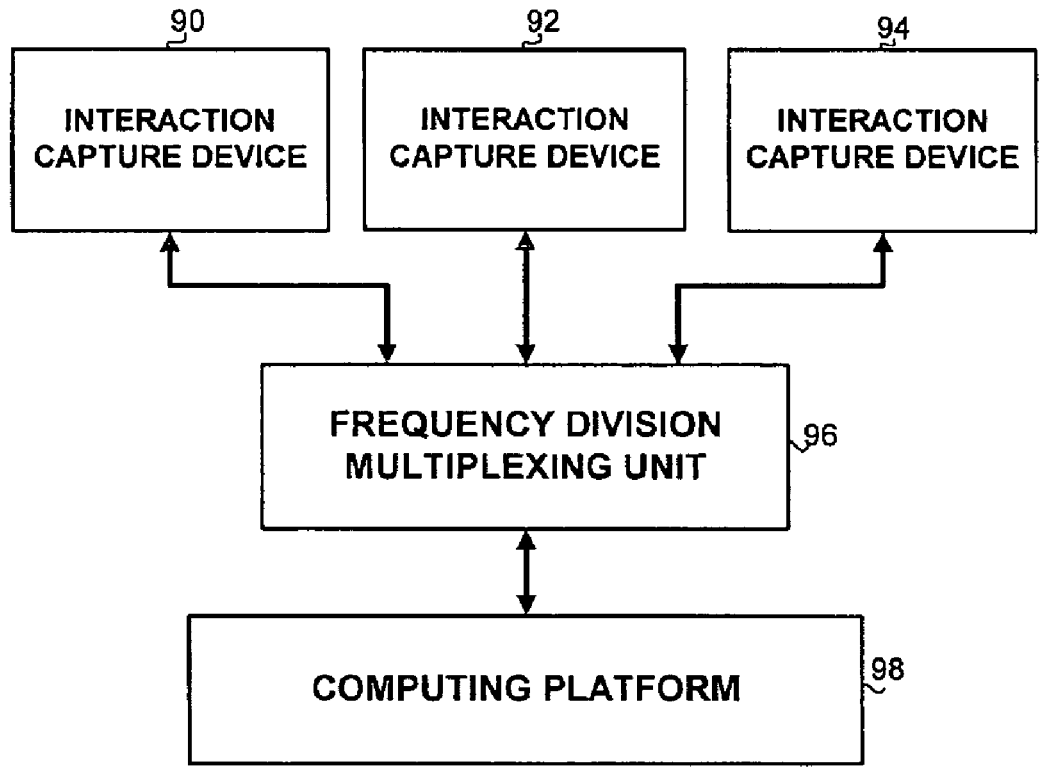
FIG. 4A is a schematic block diagram that describes a solution for transferring interaction data from multiple sources to a single computing platform.

Referring now to FIG. 4A a proposed solution for the transfer of interaction data from multiple sources to a single computing platform is described. FIG. 4A shows a first interaction capture device 90, a second interaction capture device 92, a third interaction capture device 94, a frequency division multiplexing unit 96, and a computing platform 98. The interaction capture devices 90, 92, 94 could be video input devices, such as video cameras, audio input devices, such as microphones or any other device that could capture interaction data in diverse format during the performance of a face-to-face interaction. The interaction data captured by the devices 90, 92, 94 is relayed to the frequency division multiplexing unit 96. The unit 96 multiplexes the interaction data into low-frequency, low-bandwidth signals where the data from the various input devices is characterized by the specific frequency range assigned thereto. Next, the unit 96 feeds the combined signals to signal to the computing platform 98 for capture, de-multiplexing and separate storage in accordance with the frequency range values of the combined signal.

Figure 4B:
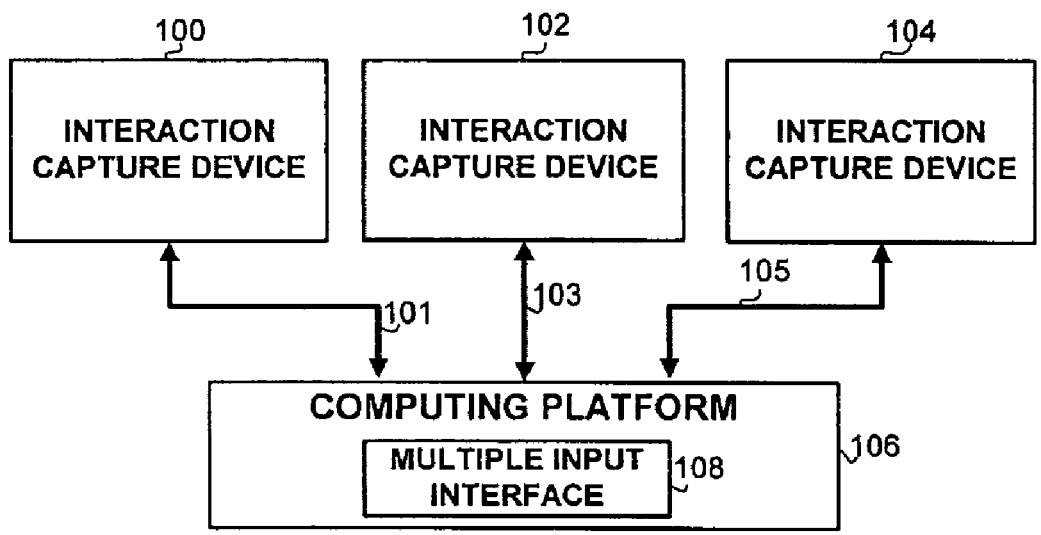
FIG. 4B is a schematic block diagram that describes an alternative solution for transferring interaction data from multiple sources to a single computing platform.

Referring now to FIG. 4B that describes an alternative solution for the transfer of interaction data from multiple sources to a single computing platform. FIG. 4B shows a first interaction capture device 100, a second interaction capture device 102, a third interaction capture device 104, a first transfer channel 101, a second transfer channel 103, a third transfer channel 105, and a computing platform 106. The computing platform 106 includes a multiple input interface 108. The interaction capture devices 100, 102, 104 could be video input devices, such as video cameras, audio input devices, such as microphones or any other device that could capture interaction data in diverse format during the performance of a face-to-face interaction. The interaction data captured by the devices 100, 102, 104 is relayed via the associated transfer channels 101, 103, 105 respectively to the multiple input interface 108 of the computing device 106. The multiple interface device 108 could be associated with a multi-channel input unit, such as for example a SoundBlaster.

One of the major challenges in a walk-in face-to-face interaction environment is the lack of the CTI or CDR feed. This is limiting not only since it is needed to separate the stream into interactions representing independent customer interactions but also since the data describing the call is required for other uses. This data, referred to as metadata can include the agents name or specific ID, the customer name or specific ID, an account number, the department or service the interaction is related to, various flags such as to indicate if a transaction was completed or if the case has been closed in addition to the beginning and end time of the interaction. This is the type of information one usually receives from the CTI link in telephony centric interaction but is not available in this environment due to the fact that an interaction-enabling platform, such as telephony switch, is not required.

The metadata is typically used for three uses: a) to determine the beginning and end of the interaction, b) to provide additional data to describe the interactions entry in the database of recorded interactions for enabling fast location of a specific interaction, and c) to drive recording decisions and flagging of interactions based on this data.

Referring back to FIG. 1 the solutions proposed to overcome these three obstacles, regarding the determination of beginning and end of recording will be set forth next. The use of (a) what can be defined as "Block Of Time" recording, were time intervals are predefined for the interaction capture and storage unit 15 to record all interactions taking place at that particular time periods. (b) Screen event driven recording can define the start or end of recording based on an event/action made in the application running on the agent's desktop which is typical or representative of the start or end of an interaction or of a part or interaction which is of interest. Non-limiting examples are launching of a new customer screen in the CRM application, agent opening a new customer file, or inviting next customer in line by clicking on the "Next" button in the queue management system application, or whenever a discount of more then $100 is entered into a CRM application's designated data field, or whenever a specific screen is loaded then start recording. Screen activity is captured by screen capture and storage component 17. The screen event capturing agent action is fully described in co-pending PCT patent application serial number PCT/IL02/00197 titled A METHOD FOR CAPTURING, ANALYZING AND RECORDING THE CUSTOMER SERVICE REPRESENTATIVE ACTIVITIES filed 12 Mar. 2002, and in PCT patent application serial number PCT/IL02/00796 titled SYSTEM AND METHOD FOR CAPTURING BROWSER SESSIONS AND USER ACTIONS filed 24 Aug. 2001 both are incorporated herein by reference. Furthermore, by correlating the screen events with voice content analysis one can reach a higher level of accuracy for example by identifying the end of the interaction by the agent saying "next" and at a near time closing the customer's file in the CRM application. (c) Selective recording based on real time video content analysis is another solution for determining start and stop sessions as well as the complete identification of the parties interacted. An example of using face recognition algorithm is explained in detail in VIDEO AND AUDIO CONTENT ANALYSIS SYSTEM, which is incorporated herein by reference, detailed of application stated below. Algorithm running for example on NICE propriety hardware/firmware DSP's based boards or on (OTS) Off-The-Shelf board uploaded with known in the art other face recognition algorithms. As mentioned earlier the video, agent screen and voice are time synchronized and as such the start and end of interaction is deterministic. Frame presence detection defines a video frame to trigger recording whenever a person is detected (co-exist) for more then x seconds, when video frame empty then stop recording (similar to energy level detection in Voice recording). Frame content manipulations are inherent in NICE VISION Product of NICE Systems Ltd. Example of capabilities of object/people video content-based detection can be found in co-pending U.S. provisional patent application Ser. No. 60/354,209 titled ALARM SYSTEM BASED ON VIDEO ANALYSIS, filed 6 Feb. 2002 which is incorporated herein by reference. As mentioned the video signal capturing & storing component 20 recording is triggered selectively using face recognition for example recording pre-defined customers such as VIP customers, or only customers that their pictures are already stored in organization database 19 or any type of recording (total and/or selective) according to the service provider preferences. Preferably any pre-determined content of video can be used to identify start/stop the recording of frontal interaction. Coverage of video content analysis is described in details in co-pending US patent application titled: VIDEO AND AUDIO CONTENT ANALYSIS SYSTEM, Ser. No. 10/056,049 dated Jan. 30, 2001 stating the real-time capabilities based on video content analysis done using Digital Signal Processing (DSP/s) which is incorporated herein by reference. (d) The use of ROD (Record On Demand) is another solution for determining, or in this particular case manually controlling the start and end of interaction/recording. With ROD the agent can start and stop recording according based on his needs. For example whenever a deal is taking place he will record it for compliance needs, but he will not record when the customer only came to ask a question. The actual trigger of the recording can either be performed by a physical switch connecting and disconnecting the microphones from the capture device or by a software application running on the agent's computation device. (e) Total Recording is a straightforward solution to mean, record and store all calls during working hours of the service center, preferably if work force management system exists on site it can be integrated as to provide all agent's working periods and brake offs. NICE SYSTEMS Ltd. integration with Blue Pumpkin Software Inc. of Sunnyvale Calif. is a non-limiting example of using working hours information to calibrate scheduled based recording. (f) API Level integration with host applications in the computing system is another example of providing control capabilities on when start and end recording is set. Several capabilities can be achieved setting start and stop API commands, setting routing calls command and the like. Non-limiting example is the provider of CRM, Siebel Systems, Inc. of San Mateo, Calif., certified Integration with NICE SYSTEMS that consequently provided recording capabilities embedded within Siebel's Customer Relationship Management solution applications. Using ActiveX components or other means of command delivery, information can be inserted into the scripts of any host application the agent uses it in order that when he begins handling the customer the recording is started and when the handling ends it is stopped. (g) Integration with Queue Management Systems is a genuine solution for triggering and automatically controlling the start and stop recording. Queue management systems commonly control the flow of customer through walk-in environments. By integrating with such systems one can know when a new customer is assigned to an agent and the agent's position. Hence, by integrating with the queue management system we can understand when the interaction begins and if next one in queue deduces that previous interaction has ended. By deducting this we can trigger start and stop recording based on the status the queue management system holds for the agent. An example of a Queue Management System would be solutions (hardware and software) by Q-MATIC Corporation of Neongatan 8 S-43153 Molndal, Sweden. It will be evident to the person skilled in the art that any combination of the above options (a) to (g) is contemplated by the present invention.

It would be readily understood that a usable, analyzable, re-creatable interaction recording should have a precisely identifiable beginning point and termination point. Where enabling platforms are utilized for the interaction sessions, such as telephone networks, data communication networks, facsimile devices, and the like, a well-defined and easily identifiable staring point and termination point is readily recognizable. In walk-in environments there are no available means for reporting and storing information concerning the beginning point and the termination point of the interaction since currently, walk-in environments are characterized by a substantially continuous stream of customers entering to seek the services provided. As a result, interactions conducted at a service point are easily "merged" one into the other. Customers access the service point positions according to a waiting queue and leave the service points immediately after the completion of their business. In addition, since typically there is no enabling platform associated with a walk-in environment service point, determining and storing the beginning and the end of a customer-specific interaction is extremely problematic.

Figure 5:
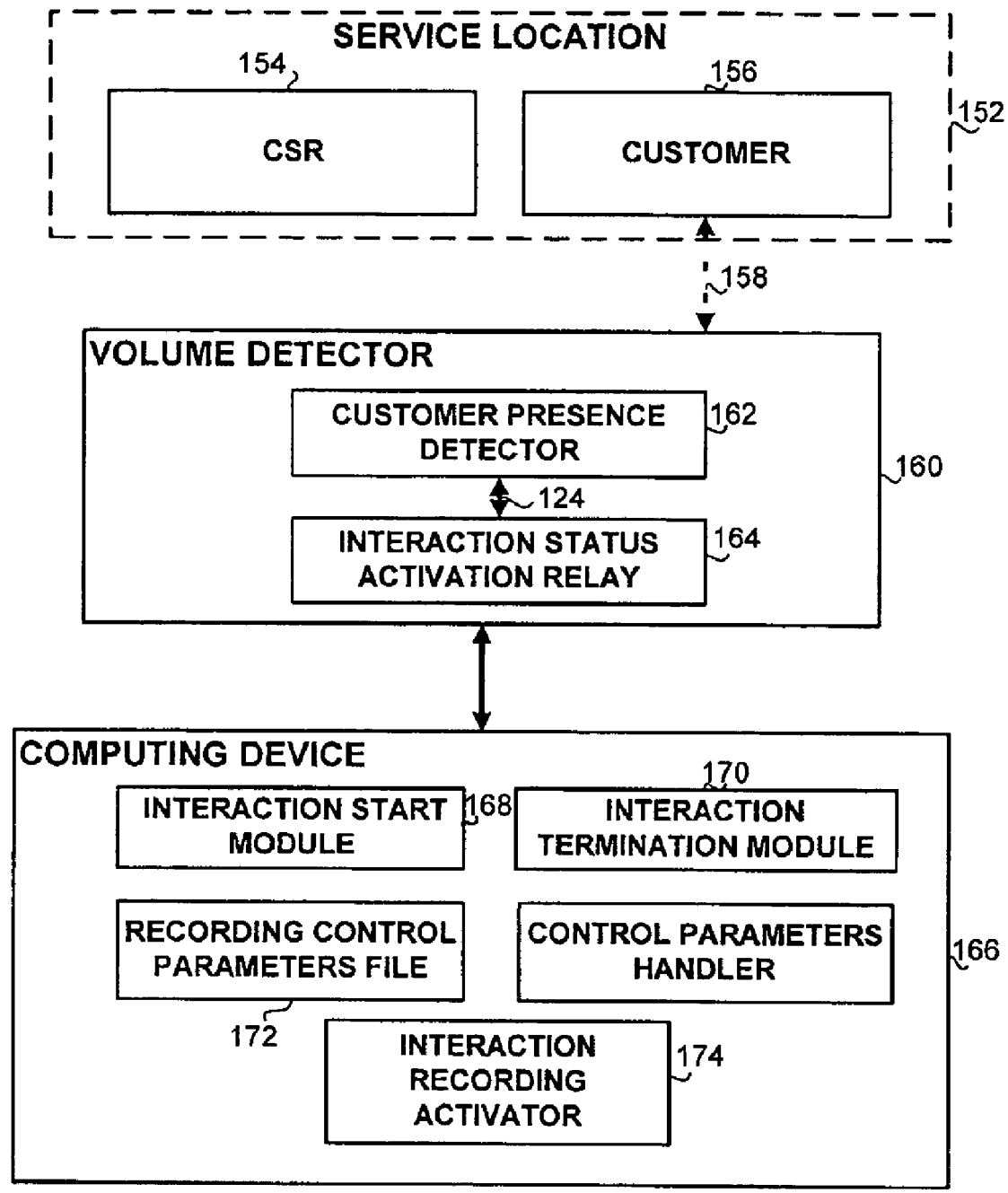
FIG. 5 describes the identification of the beginning point and the termination point of a face-to-face interaction.

Referring now to FIG. 5 that shows a proposed solution for the identification of the beginning point and the termination point of a face-to-face interaction within walk-in environments. The solution is to install a simple volume detector or like apparatus, which will detect that the customer has approached the CSR and has left. Persons skilled in the art will appreciate that like apparatuses can also be used in the context of the present invention. FIG. 5 shows a service location 152 in a walk-in environment, a volume detector 160, and a computing platform 166. The location 152 could be a service counter, and the like, where a face-to-face interaction is taking place between a CSR 154 and a customer 156. In order to identify the beginning point and the termination point of the interaction the volume detector 158 is utilized. The detector 158 could be an alarm system element which is installed in the close proximity of the service location 152, such that the option for the detection of the presence or non-presence of the customer 156 is available. One such detector 158 is the Visionic Hardwired Motion detector manufactured by Visonic, Tel Aviv, Israel. When the customer 156 approaches the customer service representative (CSR) 154, stops near the service counter in front of the representative 154 or sits down in front of the representative 154, a customer presence detector 162 installed in the shelf volume detector 158 will detect the presence of the customer 156. The detection signal 158 will in turn trigger an electrical signal for the activation of an interaction status activation relay 164 installed in the shelf volume detector 160 in a pre-defined manner. An open state of the relay 164 could either indicate the presence of a customer 156 or alternatively the open state of the relay 154 could indicate non-presence of the customer 156. When the relay 164 is activated the state of the relay 164 is modified either from open state to closed state or from closed state to open state. A signal signifying a change in the state of the relay 164 is transmitted to the computing platform 166 and recognized by a main control module (not shown) installed therein. Subsequently, the control module (not shown) will load and activate an interaction start module 168 installed in the computer platform 166 by sending a "start interaction" command utilizing, for example, a proprietary Application Programming Interface (API) instruction. Note should be taken that the "start interaction" command is not identical to a "start interaction recording command". The start interaction command will be associated with additional available information, such as start time, agent name, and the like. The main control module will check whether the interaction 152 should or should not be recorded by examining the pre-defined criteria held by an interaction recording program (not shown) or examining the recording control parameters stored in recording control parameters file 172 in the computing platform 166. In accordance with the results of the examination the interaction 152 will be either recorded following the activation of the recording program (not shown) by the interaction recording activator 174 or the interaction 152 could be conducted without being recorded. The customer 156 will leave the point of service at the termination of the interaction 152. The volume detector 160 will detect the leaving of the customer 156 and the arrival of a next customer. Accordingly, the state of the relay 164 will be modified. The relay 164 state change will be recognized by the main control module and as a result a "stop interaction" command is issued to the interaction termination module 170 utilizing a proprietary API instruction. Note should be taken that the termination of the interaction 152 does not necessary effect the termination of a recording. The recoding is typically continues for a limited period of time (typically for a few seconds) in order to enable capturing the CSR 154 wrap up time as a screen event. The wrap up time is defined as the point whereat the CSR 154 finishes updating the interaction with finalizing information in the CRM system.

Figure 6:
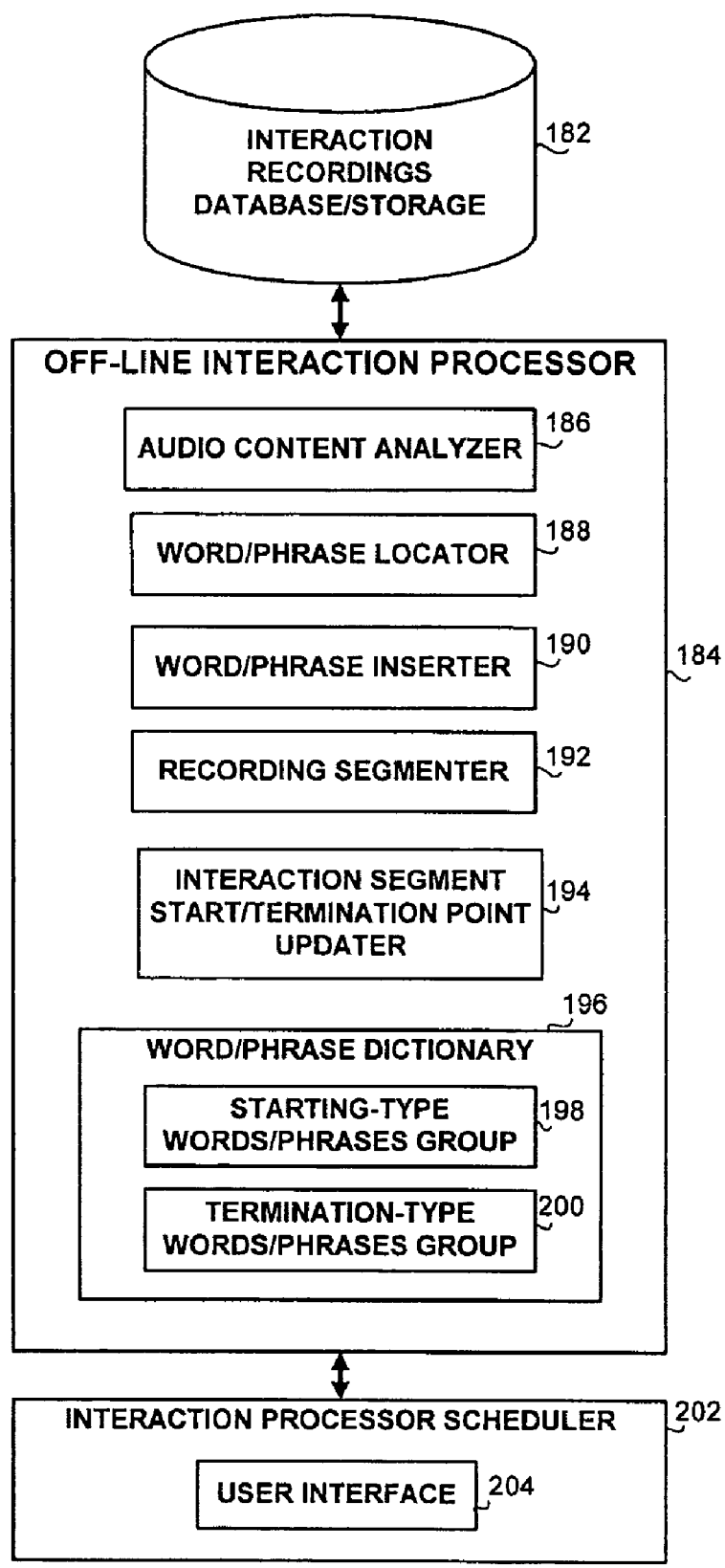
FIG. 6 shows the elements operative in the off-line utilization of an audio content analyzer in order to segment a stream of interaction recordings to the constituent interactions.

Referring now to FIG. 6 that shows the elements operative in the off-line use of an audio content analyzer in order to segment a stream of interaction recordings to the constituent interactions therein. The segmentation is performed in order to determine the beginning and end of each interaction or each other segment such as a party speaking, a wait period, a non-customer interaction and the like. An interaction can be defined as the exchange of information between two persons. A segment can be defined as a part of an interaction to include a segment where one party only speaks and the like. The drawing under discussion shows an interaction recordings database or storage 182, an off-line interaction processor 184, and an interaction processor scheduler 202. The off-line interaction processor 184 includes a word spotter module 186, a word/phrase locator 188, a word/phrase inserter 190, a recording segmenter 192, an interaction segment beginning/termination point updater 194, and a word/phrase dictionary 196. The dictionary 196 includes a start-type words/phrases group 198, and a termination-type words/phrases group 200. The proposed solution requires that the entire stream of the interactions be recorded for at least a limited period. The limited period should include at least one full segment or interaction. Note should be taken that although some portions of all the interactions are recorded this alternative solution applies to selective recording environments as well as for total recording environments. The execution of the off-line interaction processing is controlled by the interaction processor scheduler 202 where the operative parameters are submitted by a user via a user interface 204. At a pre-defined point in time the scheduler 202 will activate and run the off-line interaction processor 184. The pre-defined moment in time can be an hourly schedule, or a predetermined event or time. The processor 184 will sequentially scan the interaction recordings database or storage 182. The interaction recordings database or storage 182 can be a short term memory, a transient memory device, a storage media such as a disk or any other media capable of holding the interaction stream from the capture until it is processed or discarded. The processor 184 will activate the audio content analyzer 186 in order to identify phrases appearing in the interaction recordings that are characterized by being used typically by the interaction participants near the beginning point and near the termination point of an interaction. Thus, such phrases and words will be located in the beginning portion and in the terminating portion of an interaction. For example, phrases commonly used at the beginning of an interaction, are "hello my name is John, how may I help you?", "how may I help you?", "what is your account number?" and the like. For example, phrases and words commonly used at the termination of an interaction are "goodbye", "thank you for your time", "Thank you for paying a visit to our store" or "feel free to pay us a visit in the future", and the like. The word/phrase dictionary 196 holds two groups of phrases and words. The first group 198 includes a list of phrases and words typically used at the beginning portion of an interaction while the second group 200 includes a list of phrases and words typically used at the termination portion of an interaction. Note should be taken that the measure of accuracy of the interaction segmentation process will depend directly on the size and content of the phrase/word dictionary 196. Preferably, but not necessarily, two processing passes are applied to the interaction recordings 182. In the first pass the process utilizes the word/phrase locator 188 that will attempt to locate the common phrases/words from the two word/phrase groups 198, 200 in the interaction recordings stream 182. The operation of the word/phrase locator 188 effects the matching of the common phrases with the phrases/words spotted in the recording 182. When a match is made, the common phrase/word is inserted into the recordings 182 by the word/phrase inserter 190. Subsequent to the completion of the first pass, the second pass is performed in which the recording segmenter 192 is executed. The responsibility of the segmenter 192 is in the segmentation of the recordings 182 into the constituent interactions by utilizing the previously inserted common phrases/words indicating a beginning point and the common phrases indicating a termination point in the audio stream as markers defining the limits of the interactions. The segmenter 192 will use the first beginning phrase/word mark that comes after an ending phrase/word mark and mark it as the interaction start and use the last ending phrase/word mark before another start phrase and set it as the interaction ending point. After the completion of the second pass the recordings 182 should be segmented into a number of separate, distinct and identifiable interactions. It will be readily appreciated that a single pass using a single dictionary is also contemplated by the present invention. A single dictionary may include both the words and phrases and a single pass can be used to conduct both tests. In addition, a single pass can also be made to conduct any one of these tests and if such test is successful then a second pass is not required. Next the interaction will be updated by the interaction segment start/termination point updater 194. The updater 194 will determine and update the interaction's beginning point in time and the interaction's termination point in time. The information will be available later for the interaction management examiners or other users that desire to query for a specific interaction.

To conserve storage space, recordings processed can be optionally deleted and discarded wither automatically according to predetermined parameters or manually by an administrator of the system. For example, at a later point in time, typically selected by a user (not shown) of the system, the system will execute a process that will scan the interaction recordings 182. Based on the details of the recorded interaction, said details can include words/phrases identified in the recording, or details external to the recording such as the time and date recorded or length or the like, the system will determine which of the interaction recordings should be deleted. When the deletion process is completed only the interactions which were initially defined to be recorded will remain in the database 19. The non-recordable interactions will be deleted by an independent auto-deletion mechanism (not shown). Thus, a stream of interaction is separated into separate segments constituting interactions or other segments recorded in a walk-in environment or where no other external indication of the beginning and end of an interaction or segment is provided.

Referring back to FIG. 1 recording of silence can be avoided using either VOX activity detection for determine microphones activity or by using, later discussed in detail, video content to detect customer present in the (ROI) Region Of Interest covered by camera or either using screen and computer information to determine agent activity for example whether agent is logged off, and the like scenarios. The different algorithms are parts of the respective components 17, 18, 20 constituting the interaction capture and storage units 15. Agents can also avoid recording if they turn off their microphones when they are not working.

Several alternative solutions directed for determining the beginning point and the termination point of the interaction 21 were described herein above. Now to the second obstacle, namely the problem of generating the metadata for describing the interactions entry in the database of recorded interactions, for the purpose of enabling fast query on the location of a specific interaction as well as to drive recording or interaction flagging decisions and for further analysis purposes. Metadata collection is one of the major challenges in Walk-in face-to-face recording environments characterized by the lack of the CTI or CDR/SMDR feed. This is limiting not only because it is needed to separate the interactions, previously discussed, but also because the data describing the call is required for other uses. This data, referred to as metadata can include the agents name or specific ID, the customer name or specific ID, an account number, the department or service the interaction is related to, various flags such as if a transaction was completed in the interaction or if the case has been closed, in addition to the beginning and end time of the interaction. This is the type of information one usually receives from the CTI link in telephony centric interaction but it is not available in this kind of frontal interaction based environment due to the fact that an interaction-enabling platform, such as telephony switch, is not required. As mentioned the metadata is typically used for defining the beginning and end of the interaction. It is also used for providing additional data to describe the interactions entry in the database of recorded interactions to enable fast location of a specific interaction. And, finally to drive recording decisions and flagging of interactions based on this data. An example for recording decisions is random or rule-based selection of interactions to be recorded or flagged for the purposes of quality management. A typical selection rule could be two interactions per agent per week, or one customer service interaction and one sales interaction per agent per day and one interaction per visiting customer per month. As the start and end of interaction was described in detail in the previous paragraph, the remaining metadata gathering of interaction's related information is accomplished using the following methods. (a) By logging the agent network login for example Novell or Microsoft login or supplying the agent an application to log-into the system, it is possible to ascertain which agent is using the specific position recorded on a specific channel and thus associate the agent name with the recording. (b) Again, as before capturing data on the agent's screen or from an application running on the computing device, either by integrating API commands and controls into the scripts of the application or by using screen analysis as shown in PCT co-pending patent application serial number PCT/IL02/00197 titled A METHOD FOR CAPTURING, ANALYZING AND RECORDING THE CUSTOMER SERVICE REPRESENTATIVE ACTIVITIES filed Mar. 12, 2002 and in PCT co-pending patent application serial number PCT/IL02/00796 titled SYSTEM AND METHOD FOR CAPTURING BROWSER SESSIONS AND USER ACTIONS filed Aug. 24, 2001 both are incorporated herein by reference. When provided in real time this can be used for real-time triggering of recording based on the data provided but more important it may be used to extract metadata from an existing application and store it in the database component 19. (c) By adding a DTMF generator and a keypad to the microphone mixer and/or amplifier enabling the agent or customer, to key-in information to be associated with the call such as customer ID or commands such as start or stop recording and the like. The DTMF detection function, which is a known in the art algorithm and typically exists in digital voice loggers, is then used for recognizing the DTMF digits generated command or data and then the command is either executed or data is stored and related to the recording as metadata.

In addition, the system may be coupled and share resources with a traditional telephony environment recording and quality management solution for example: NiceLog, NiceCLS and NiceUniverse by NICE Systems Ltd. of Raanana, Israel. In such an implantation where two recording solutions co-exists part of the recording resources for voice and screen are allocated for recording of phone lines part for frontal face-to-face capturing device recording and events and additional information for these lines, are gathered through CTI integration. In such an environment one can then recreate all interactions related to a specific data element such as all interactions both phone and frontal of a specific customer. This can include, for example, the check-in and checkout of a hotel guest in conjunction with his calls to the room service line.

An analyzer engine which is preferably a stand-alone application, which reads the data, most preferably including both events and content, performs logic actions on the captured data is able to assess the performance of the agent. The controlling operator of the analyzer engine, such as a supervisor for example, can optionally predefine reports to see the results.

Automatic QM (quality management) should help the supervisor to do more than simply enter information into forms, but rather should actually perform at least part of the evaluation automatically.

Optionally, a manual score from the supervisor may also optionally be added to the automatic score. There may also optionally be a weighting configured, in order to assign different weights to the automatic and manual assessments.

When the accuracy of the automatic QM scores reaches a relatively high level, for example after the analysis application has been adjustably configured for a particular business, the new system may optionally at least reduce significantly the human resources for quality management. Therefore, the analyzer engine more preferably automatically analyzes the quality of the performance of the agent, optionally and most preferably according to one or more business rules. As previously described, such analysis may optionally include statistical analyses, such as the number of times a "backspace" key is pressed for example; the period of time required to perform a particular business process and/or other software system related process, such as closure for example; and any other type of analysis of the screen events and/or associated content. Statistical analysis may also optionally be performed with regard to the raw data.

Due to the fact that face-to-face interactions may take place in environments with relatively high levels of noise there is a need to address the issue of audio quality and to provide improvement of the audio quality. In some environments simply using a multi-directional microphone will be sufficient. However, in environments with significant levels of ambient noise and interferences from neighboring positions a solution must be given to enable a reasonable level of understandability of the recorded voice. Solutions can be divided into three kinds: (1) Solutions external to the capture and recording apparatus, these kind of solutions include solutions for ambient noise reduction that are known in the art and use specialized microphones or microphone arrays with noise canceling functions. (2) Solutions within the capture and recording apparatus, which include noise reduction functions, performed in the capture and logging platform either during playback or during preprocessing of the input signal as shown in co-pending PCT patent application serial number PCT/IL02/00593 titled METHOD, APPARATUS AND SYSTEM FOR CAPTURING AND ANALYZING INTERACTION BASED CONTENT filed Jul. 18, 2002 incorporated herein by reference. Furthermore, as part of the audio classification process in the pre-processing stage described in detailed in this co-pending PCT patent application FIG. 4, filtering of background elements such as music, keyboards clicks and the like is discussed. (3) Another solution uses both (1) and (2) solutions from above—the external and the internal noise reduction. It offers a split between capture and recording apparatus and the environment external to this apparatus. This would include any combination of solutions presented in (1) and (2) for example a solution in which two directional microphones are pointed towards the customer and agent respectively, their signal enter the capture and logging platform where the sound common to both is detected and negated from both signals. Then both signals are mixed and recorded. They can also remain separated and be mixed only upon recreation of the voice-playback. Another example of a solution like this is one in which the two microphones are mixed/summed electronically using an electronic audio mixer and enter the capture and logging platform. In addition, an ambient signal is received by an additional multi-directional microphone located in the environment and enters the capture and logging platform. In the capture and logging platform the ambient noise is negated from the mixed agent/customer signal before recording or during playback.

Figure 7:
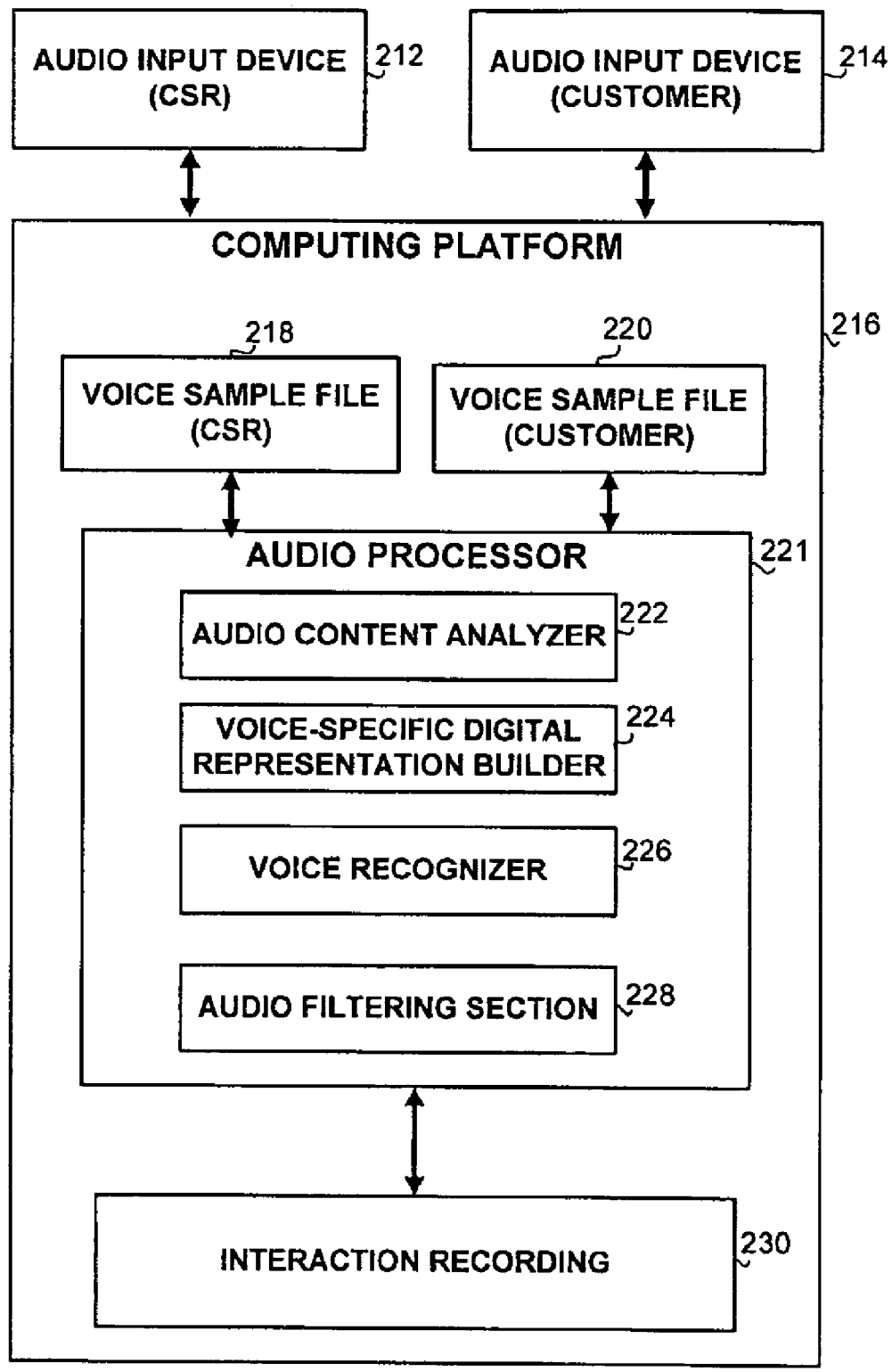
FIG. 7 describes the elimination of ambient noise and electronic interference.

Referring to FIG. 7 that shows an alternative solution for the elimination of noise. The solution involves the utilization of an audio content analyzer and various Digital Signal Processing (DSP) techniques for audio manipulation. FIG. 7 includes a first audio input device 212, a second audio input device 214, and a computing device 216. The first audio input device 212 is associated with a CSR while the second audio input device 214 is associated with a customer. Interaction audio data generated during a face-to-face interaction is captured by the devices 212, 214 and transferred to the computing device 216. The computing device 216 includes a voice sample file 218 for the CSR, a voice sample file 220 for the customer, an audio processor 221, and an interaction recording 230. The audio processor 221 includes an audio content analyzer 222, a voice-specific digital representation builder 224, a voice recognizer 226, and an audio filtering section 228. The audio content analyzer 222 is used for the recognition of the interaction participants. At the start of an interaction the relevant participants will be identified. The real-time audio analysis will be performed and an audio digital representation will be created for the identified speaker due to the fact that in certain cases the identity of the CSR is known in advance. An example of such an environment is one in which each CSR has its own unique login code used when logging in into the system. Another participant identifier could be a video content analyzer (not shown) that provides the identity of the CSR by utilizing face recognition techniques, and the like. A walk-in center operative in such an environment will maintain a voice sample file 218 for each of the respective CSRs. The voice sample file 218 should include the commonly used phrases/words during the interaction, such as, for example, the word "hello", the phrase "how may I help you", and the like. The system will collect sufficient voice samples for the creation of a digital representation of the participant voice. The system will use the digital representation in order to filter and refine the contents of the audio recording, such that ideally it will hold the audio data generated by the voice of two or more interaction participants. The rest is discarded as ambient noise or environmental interferences. The process will run on-line during the interaction recording in a specifically designed and developed audio processor 221 implemented on the computing platform 216. Audio input devices 212, 214 capture the audio of both customer and CSR, and the voice-specific digital representation builder 224 generates digital representations for the audio relayed from the audio input devices 212, 214. The audio processor 221 operates in conjunction with the pre-defined voice sample files 218, 220 or as a stand alone process that addresses the two audio inputs only. The audio processor 221 further includes an audio filtering section 228 to eliminate the ambient noise from the interaction recording 230 leaving only the voice of the relevant participants.

In some instances it is beneficial to record video in the walk-in environment non-limiting examples of the advantages of using synchronized video recording on site were mentioned before as part of the solutions for determining start and end of interaction and for visually identifying of parties. In cases in which a single video camera is positioned to record each service position the implementation of playback is straightforward, i.e. playing back the video stream recorded at the same time or with a certain fixed bias from the period defined as the beginning and end of the service interactions, determined as previously discussed in "frame presence detection". Other optional implementation instances would include an implementation in which two cameras are used per position, directed at the agent and customer, respectively. In this case at the point of replay the user can determine which video stream should be replayed or alternatively, have both play in a split screen. Another implementation instance would be an environment in which a strict one-to-one or many-to-one relationship between cameras and positions does not exist. In such an environment the users playing back the recording selects which video source is played back with the voice and optionally screen recording. It should be noted that the video and voice are synchronized by continuously synchronizing the clocks of the video capture & storage system with the Voice and Screen capture platform using any time synchronization method non limiting example are NTP Network Time Protocol, IRIG-B or the like. In cases where one lacks camera per position, one camera can be redirected to an active station based on interaction presence indication. Meaning that in scenarios where fewer cameras than positions exist the camera can be adaptively redirected (using camera PTZ—

Pan, Tilt, Zoom) to the active position. Note that cameras can be remotely controlled, same as in the case of multimedia remote recording vicinities.

The systems described above can operate in conjunction with all other elements and product applicable to traditional voice recording and quality management solution such as remote playback and monitoring capabilities non-limiting examples of such products are Executive Connect by NICE Systems Ltd. of Raanana, Israel. Agent eLearning solutions—such as KnowDev by Knowlagent Inc, Alpharetta, Ga. This invention method and system is advantageous over existing solutions in the sense that it provides a solution for quality management of frontal face-to-face service environments.

Quality management forms are evaluation forms filled by supervisors, evaluating the agent skills and the agent quality of service. Such forms will be correlated with the content data item during the analysis to deduce certain results. The quality management form can be automatically filled by the system in response to actions taken by the agent and/or fields filled by the agent or interactions captured. 1) Other interactions include any future prospective interaction types as long as an appropriate capture method and processing method is implemented. Such can be dynamic content, data received from external sources such as the customer or other businesses, and any like or additional interactions. Still referring to FIG. 3, the interaction content is captured and further used by the interaction and storage unit 10 in order to provide the option of handling directly the original content. Optionally previously stored, absorbed content analysis results are being used as input information to an ongoing content analysis process. For example, the behavioral pattern of an agent and/or a customer may be updated due to the previously stored content extracted recurrent behavioral pattern. The various types of interactions may be re-assessed in light of previous interactions and interactions associated therewith. The output of the analysis can be tuned by setting thresholds, or by combing results of one or more analysis methods, thus filtering selective results with greater probability of success. This enables companies to enhance their quality and get more information on their customer's satisfaction and to propose quality management solutions to cover its branches, offering the diverse type of traditional recording solutions whether it is total, selective, ROD, screen event triggered recording and the like for frontal service environments, executive tools to enable remote access to monitor and listen to interaction in the frontal service environments and when couple this solution with traditional telephony solution, yield full coverage on customer experience for better analysis.

The quality management device 504 evaluates the skills of the agent in identifying and understanding of the idea provided during an interaction. The quality management process may be accomplished manually when supervisors making evaluations using evaluation forms that contain questions regarding ideas identification with their respective weight enter such evaluations to the QM module 524. For example, supervisor may playback the interaction, checking that the idea description provided by an agent comports the actual idea provided by the customer. Score can be Yes, No, N/A or weighted combo box (grades 1 to 10). The Automatic QM module 526 can also perform quality management automatically. The Automatic QM module comprises pre-defined rule and action engines that fill the idea section of the evaluation forms automatically (without human intervention). Using screens events capturing, any information entered into the idea description fields generates event. Thus, the moment an idea is entered, the agent receives a scoring automatically.

The automatic QM (quality management) system of analyzer engine 122 according to the present invention should help the supervisor to do more than simply enter information into forms, but rather should actually perform at least part of the evaluation automatically. Optionally, a manual score from the supervisor may also optionally be added to the automatic score. There may also optionally be a weighting configured, in order to assign different weights to the automatic and manual assessments.

In order to provide an efficient solution for the quality management of interactions in a walk-in environment the operating CSR associated with the interaction should be identified. The identification of the CSR is extremely important since the usability of a recording of an interaction depends substantially on the known identity of the CSR. The identity of the CSR is vital to the capability of querying the interaction recording and to recreating the course of the interaction at a later point in time. In some walk-in environments it is highly problematic to associate an interaction with a CSR since complex procedures involving integration with and access to external sub-systems are required. The inherent complexity of the task is due typically to the non-availability of CTI information in walk-in environments.

Figure 8:
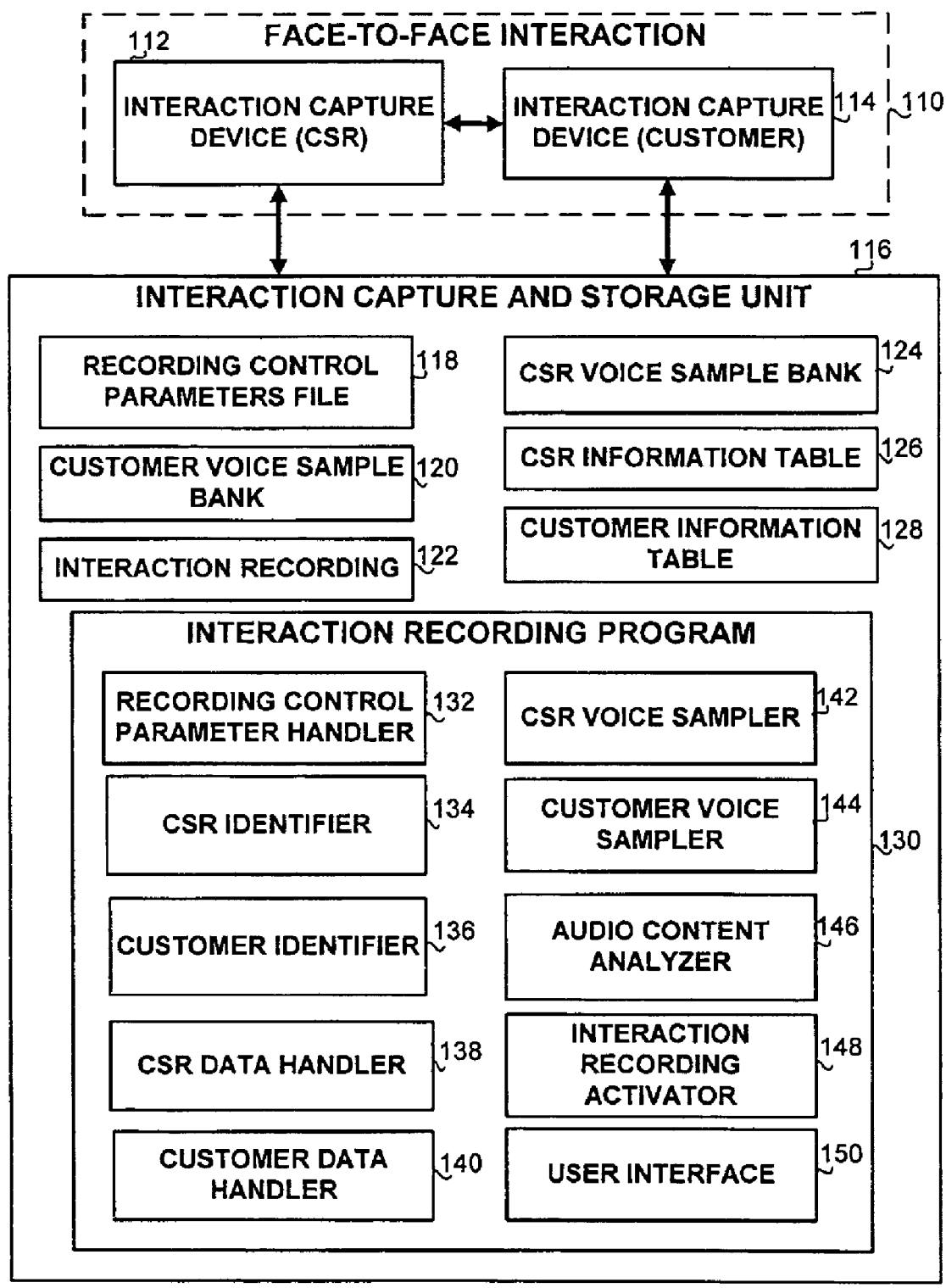
FIG. 8 is a schematic block diagram that describes the association of an interaction with the participants thereof.

Referring to FIG. 8 associating a CSR and/or a customer with a face-to-face interaction involves the identification of one or more speakers participating in an interaction. FIG. 8 shows a walk-in environment in which a face-to-face interaction 110 is taking place, and an interaction capture and storage unit 116 captures and handles the interaction. The face-to-face interaction 110 utilizes a first interaction capture device 112, such as a microphone, and a second interaction capture device 114, such as a microphone. The first interaction capture device 112 is associated with a CSR while the second interaction capture device 114 is associated with a customer or a non-CSR person. The first device 112 and the second device 114 receive the voices of the CSR and the customer respectively during the interaction. The voices are encoded into electrical signals and are transferred to the interaction capture and storage unit 116. The unit 116 includes a set of data structures and an interaction recording program 130. The data structures include recording control parameters file 118, a customer voice sample bank 120, a CSR voice sample bank 124, a CSR information table 126, a customer information table 128, and an interaction recording 128. The set of data structures can comprise one or any of the above mentioned data structures. Said data structures can be located in a single or many files on one or more storage media device or temporary memory devices. The interaction recording program 130 preferably comprise a recording control parameter handler 132, a CSR identifier 134, a customer identifier 136, a CSR data handler 138, a customer data handler 140, a CSR voice sample 142, a customer voice sampler 144, an audio content analyzer 146, an interaction recording activator 148, and a user interface. Each one of the modules noted above can be implemented in a single or many computer program in one or more modules operating various functions to enable the execution of the program which will associate between an interaction and a CSR.

Still referring to FIG. 8 the identification of the CSR and optionally the identity of the customer are established via the utilization of the audio content analyzer 146. A walk-in center running the system would maintain the CSR voice sample bank 124 and optionally the customer voice sample bank 120. Alternatively, such voice banks can be located remotely to the walk-in environment and maintained by a third party. The CSR voice sample bank 124 is a set of voice samples associated with a set of respective CSRs while the customer voice sample bank 120 is a set of voice samples associated with a set of respective customers. Both the CSR voice samples and the customer voice samples contain a set of common words and phrases, such as for example, "Hello", "How can I help you", and the like, typically used during an interaction 110. The voice samples stored in the voice sample bank 124 and the voice sample bank 120. The banks 124, 120 are used in alternative operational modes where the mode is determined in accordance with the type of the environment. In a selective recording environment the recordings are initiated by information kept in the recording control parameters file 118. Such information could include the CSR's name. The recording program determines in accordance with the control parameters file 118 whether an interaction 110 should or should not be recorded. When the system detects the beginning of an interaction 110 it examines whether interaction 110 complies with the pre-defined recording control parameters 118 stored in the recording control parameters file 118. Where the compliance criterion is satisfied the system will trigger a start-recording command. The interaction audio obtained by the interaction capture device 112 associated with the CSR is utilized in order to determine the identity of the CSR providing the service. Based on the pre-defined information held by the recording control parameters in the recording control parameters file 118 it is determined whether the interaction 110 should or should not be recorded. Consequent to the start of the interaction 110 the CSR voice sampler 144 samples the audio acquired by the CSR's interaction capture device 112. The audio content analyzer 146 processes the acquired samples using real-time audio analysis techniques. The system performs a search-and-compare operation involving the CSR voice sample bank 124 and the voice sample acquired from the CSR's microphone by the CSR voice sampler 144. When a matching voice sample is found in the voice sample bank the CSR data handler 138 obtains the details of the CSR associated with the matched voice sample from the CSR information table 126. The details are associated with the existing information provided by the system, such as start time, for example. Following the addition of the CSR details from the CSR information table 126 the system proceeds to the verification of interaction recording in accordance with the existing information. If the data signifies the recording of the interaction 110 then the system issues a start recording command to the interaction recording activator 150 which activates in turn the recording of the interaction 110. The recording of the interaction 110 effects the insertion of interaction data obtained from the interaction capture devices 112, 114 into the interaction recording 122.

In a total recording environment all the interactions are recorded. As a result, the recording program performs no recording option-verifications and no recording-control parameters are held by the system. The lack of recording-control parameters makes the examination and proper re-creation of the conduct and management of an interaction highly problematic. A possible solution involves the off-line execution of a process that regards a stream of recordings of the interactions as input data. The process activates an audio content analyzer that applies audio content analysis on the stream of interactions. The start time and termination time of the process is determined by the user. Thus, for example, the start point in time could be fixed at midnight, and the termination point in time could be set at dawn in order to prevent heavy processing loads on the computer system of the service center during periods characterized by a plurality of interactions. During the execution the audio content analyzer compares and attempts to match interaction audio with one of the voice samples stored in the voice sample bank. When a match is found, the interaction database is updated with the obtained details of the CSR. Consequent to the termination of the process the recordings of the interactions in the interactions database are marked with the identity and the details of the CSR to be used by the interaction information examiners for subsequent playback, examination, auditing, investigation, compliance checking, and the like.

While the majority of face-to-face interactions take place in spatially static manner, some specialized interactions could take place across a set of dynamically changing locations where the interaction participants desire to move or required to be moving during the performance of several distinct interactions and even during a single interaction. Some interactions could be spatially disconnected from the service points or could even be spatially disconnected from the service center. For example, a CSR could be required to conduct an interaction that is external to a physical structure housing the walk-in environment by addressing passing potential customers or potential customers entering the building. A CSR could be further required to conduct a spatially dynamic interaction, where the participants include customers walking within the internal space of the building, in order to offer certain services, goods, and the like. The recording of a spatially dynamic interaction is problematic for several reasons. These interactions could involve frequent place changes between interactions and even during a single interaction. Thus, the use of wired microphones will be non-operative. Although the CSR would be able to use a wireless microphone, it would unreasonable to request from the customers to wear a microphone when passing the shop entrance, entering the door or walking around the building. The utilization of a single microphone presents considerable difficulties when attempts are made to capture the voices of all the interaction participants with an adequate audio quality.

Figure 9:
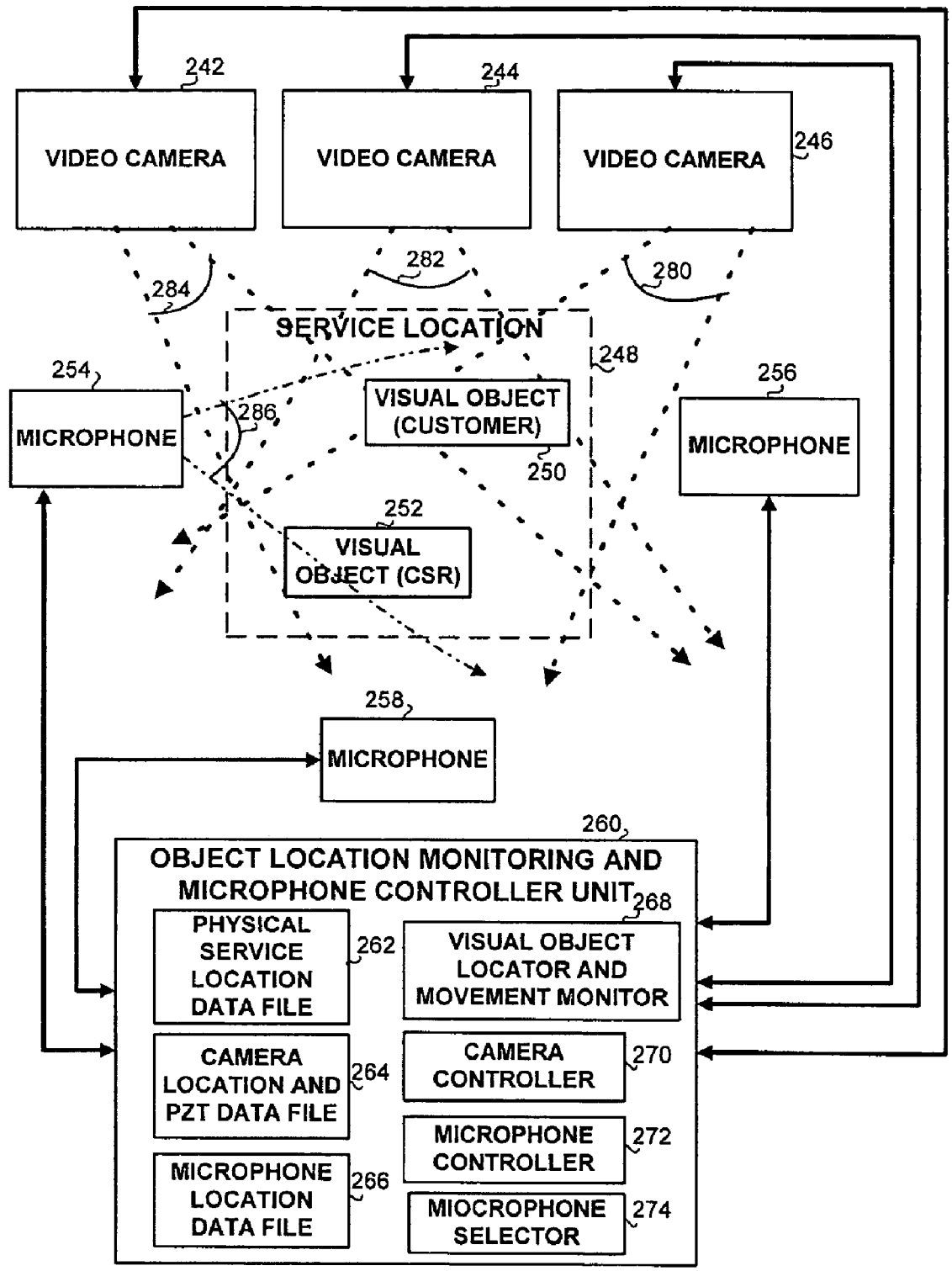
FIG. 9 describes the capturing of interaction data generated during spatially dynamic interactions.

In a walk-in environment an interaction may take place between a CSR and a customer not over a predetermined counter. Such interaction can take place in another location, such as on the store floor, or next to an item to be purchased, or in a waiting area. Such interaction will not be typically captured. Referring now to FIG. 9 showing a proposed solution to the problem of capturing interaction data from a spatially dynamic interaction. The solution involves the combined use of a technology that enables the location of an object in a space and a technology for voice capturing. FIG. 9 shows a first video camera 242, a second video camera 244, a third video camera 246, a first microphone 254, a second microphone 258, a third microphone 256, a service location 248, and an object location monitoring and microphone controller unit 260. The number of cameras and microphones shown as well as the type of these capture devices is made for the purpose of illustration and not limitation. Additional capture devices can be added or distributed along the area intended to be covered for capture of interactions. The service location 248 includes a first visual object 250 and a second visual object 252. The object location monitoring and microphone controller unit 268 includes a physical service location data file 262 to store location data of service locations, a camera location and PTZ data file 264 to store video camera location and PTZ adjustment parameters, a microphone location data file 266 to store the locations of the microphones, a visual object locator and movement monitor 268 to locate a visual object in the service location space and to monitor the movements of the located object, a camera controller 270 to control the operation and the PTZ movements of the cameras, a microphone controller 272 to control the operation of the microphones, and a microphone selector 274 to select one or more microphones in accordance with the location of one or more objects. The cameras 242, 244, 246 are deployed such that the location of the cameras 242, 244, 246 in conjunction with PTZ adjustment actuators (not shown) enables the covering every position associated with the service location 248 that potentially could be required to be covered. For each camera 242, 244, 246 the system maintains a list of physical service locations 262 characterized by the capability of the cameras 242, 244, 246 to cover such locations in conjunction with PTZ parameters used for the operation of PTZ adjustment actuators (not shown). In addition, a set of microphones 254, 256, 258 is installed in order to form a net of scattered audio acquiring devices capable of covering the entire space of the service location 248 in which the face-to-face interaction takes place. A specific camera is used to locate a visual object (250, 252) in the interaction location space. Once the object (250, 252) is located the system uses data supplied by the cameras 242, 244, 246 to generate commands to one or more microphones 254, 256, 258 that can cover the area in which the object 250, 252 began to operate. Since the referenced object 250, 252 is typically a human being it is to be assumed that the object 250, 252 will move within the interaction location space or the service location 248. In order to ensure that the interaction will be recorded in its entirety the object 250, 252 will be tracked by one or more cameras 242, 244, 246 continuously. The set of cameras 242, 244, 246 are configured such that overlapping areas are formed that are covered by more than one camera. The creation of the overlapping areas ensures that a moving object 250, 252 will be permanently tracked as long as within the boundaries of the pre-defined recordable space. The interaction video could be captured via a single ceiling-mounted microphone placed exactly above the participants. If the position data generated by the cameras 242, 244, 246 indicate that a single microphone is not sufficient for capturing the interaction audio then the system will use several microphones 254, 256, 258 for forming a virtual beam. The virtual beam will capture the audio from the entire interaction area or service location 248. In such a case it is likely that ambient noise will be captured alongside the interaction audio. In order to overcome the problem of the ambient noise the system will perform summation of the inputs coming from each microphone. The summed data will be manipulated by DSP techniques such as to keep the relevant interaction data while eliminating the ambient noise.

The person skilled in the art will appreciate that what has been shown is not limited to the description above. The person skilled in the art will appreciate that examples shown here above are in no way limiting and serve to better and adequately describe the present invention. Those skilled in the art to which this invention pertains will appreciate the many modifications and other embodiments of the invention. It will be apparent that the present invention is not limited to the specific embodiments disclosed and those modifications and other embodiments are intended to be included within the scope of the invention. Although specific terms are employed herein, they are used in a generic and descriptive sense only and not for purposes of limitation. Persons skilled in the art will appreciate that the present invention is not limited to what has been particularly shown and described hereinabove. Rather the scope of the present invention is defined only by the claims, which follow.

We claim:

1. An apparatus for capturing, storing and retrieving face-to-face interactions between an agent and at least one customer in walk-in environments for the purpose of further analysis and quality management, the apparatus comprising:

a device for capturing and storing substantially fully a face to face interaction in the presence of the agent and the at least one customer parties;

a database for storing data and metadata information associated with the captured face-to-face interaction, thus obtaining a stored face-to-face interaction; and a quality management system comprising an application for receiving input from a human team-leader or a supervisor filling an evaluation form, for evaluating the performance of the agent by the team-leader or the supervisor, from the stored face-to-face interaction for enhancing an at least one service suggested to the at least one customer, or for getting information about the at least one customer's satisfaction, or for proposing a quality management solution.

2. The apparatus of claim 1 wherein the device for capturing the face-to-face interaction comprises the elements of:

at least one microphone for obtaining interaction audio and for generating signals representative of the interaction audio and for relaying the signals representative of the interaction audio to a telephone line;

a device connected between the at least one microphone and the telephone line for gain and impedance matching and for detecting an on-hook state and an off-hook state of a telephone handset associated with the telephone line; and a voice capture and storage unit connected to the telephone line for capturing voice represented by the analog signals and for storing the captured voice.

3. The apparatus of claim 2 wherein the voice capture and storage unit further comprises a voice operated switch for minimizing interference when no interaction recording is taking place and for triggering energy-driven voice recording.

4. The apparatus of claim 2 further comprises:

a digital unit connected between the microphone and the telephone line for converting analog signals representative of the interaction audio to digital signals and for transmitting the converted digital signals to the telephone line in a pre-defined time slot when an associated telephone handset is in on-hook state, and for discarding the converted digital signals or mixing the converted digital signals with digital signals from the telephone handset when the associated telephone handset is in off-hook state.

5. The apparatus of claim 1 wherein the device for capturing and storing comprises:

an at least one camera having pan-tilt-zoom adjustment actuators and controlled by a camera selector mechanism and linked to an on-line pant-tilt-zoom adjustment control mechanism, installed in pre-defined locations configured to provide visual covering of an at least one physical service location holding a potentially recordable interaction;

a list of an at least one physical service location associated with the at least one camera; and a camera selector mechanism for determining the status of the at least one camera and for selecting an at least one camera to cover the at least one physical service location.

6. The apparatus of claim 5 further comprising an at least one pan-tilt-zoom parameter associated with the at least one physical service location for providing an at least one pan-tilt-zoom adjustment parameter value.

7. The apparatus of claim 6 wherein the pan-tilt-zoom parameter comprises the spatial definition of the at least one physical service location.

8. The apparatus of claim 6 wherein the at least one pan-tilt-zoom parameter comprises movement required to change the camera's position, tilt or pan to allow capture of the at least one physical service location.

9. The apparatus of claim 5 wherein the camera selector de-assigns the at least one camera from the at least one physical service location.

10. The apparatus of claim 5 further comprising an at least one microphone for detecting audio signals at least one physical service location holding a potentially recordable interaction.

11. The apparatus of claim 10 wherein based on an analysis of the audio signals captured by the at least one microphone the camera selector assigns or de-assigns the at least one camera from the at least one physical service location.

12. The apparatus of claim 1 wherein the device for capturing and storing comprises a frequency division multiplexing unit for receiving signals representing interaction data from an least one interaction input device and for multiplexing the input signals and for transmitting the multiplexed signals to a capture and storage unit.

13. The apparatus of claim 12 further comprises a computing device having at least one input channel for receiving interaction video from an at least one camera and for relaying the interaction video from the at least one camera to a processor unit.

14. The apparatus of claim 12 further comprises an at least one voice sampler data device associated with an at least one interaction participant for identifying the at least one interaction participant by comparing the captured voice of the at least one participant with the at least one voice sampler data.

15. The apparatus of claim 12 further comprises a volume detector device located at an interaction location and for detecting the presence of an interaction participant and the absence of an interaction participant.

16. The apparatus of claim 15 wherein detecting the presence or the absence of an interaction participant provides interaction beginning determination and interaction termination determination.

17. The apparatus of claim 1 wherein the device for capturing and storing comprises an audio content analyzer applied to a recording plurality of interactions for segmenting the recording plurality of interactions into separate at least one interaction or segment.

18. The apparatus of claim 17 wherein the audio content analyzer identifies at least one verbal phrase or word characteristic to the beginning portion of an interaction or segment, said verbal phrase or word is defined as the beginning of the interaction or segment.

19. The apparatus of claim 17 wherein the audio content analyzer identifies at least one verbal phrase or word characteristic to the ending portion of an interaction or segment, said verbal phrase or word is defined as the termination point of the interaction or segment.

20. The apparatus of claim 1 wherein the device for capturing and storing comprises:
an audio content analyzer applied to a recording of an interaction for identifying the interaction participants;
an audio processing unit connected to the interaction input device for generating a digital representation of the voices of the interaction participants; and
an audio filtering unit applied to the recording of the interaction for eliminating the ambient noise from the interaction recording.

21. The apparatus of claim 1 wherein the device for capturing and storing comprises:
a first audio input device associated with a customer service representative for capturing a first interaction audio data generated during the face-to-face interaction;
a second audio input device associated with a customer for capturing a second interaction audio data generated during the face-to-face interaction; and
a computing device for receiving the interaction audio data captured by the first and second audio input devices, and for identifying the interaction participants by comparing the first and second interaction audio data generated during the face-to-face interaction with previously stored audio files.

22. The apparatus of claim 21 wherein the computing device further comprises an audio processor for generating a representation for the audio relayed from the first and second audio input devices to be compared with previous audio files representative of the audio files generated previously by the participants.

23. The apparatus of claim 1 wherein the device for capturing and storing comprises:
at least one camera installed at an interaction location having pan-tilt-zoom movement capabilities and linked to a pan-tilt-zoom adjustment controller for providing visual covering of the interaction area and for locating an object in the interaction location space and for tracking an object in the interaction location space; and
at least one microphone installed at the interaction location for audio covering of the interaction area.

24. The apparatus of claim 23 wherein the at least one camera installed at the interaction location is connected to an object location and microphone controller unit for directing said cameras to a predetermined service location.

25. The apparatus of claim 24 wherein the object location and microphone controller unit comprises a visual object locator and movement monitor for locating an object within the service location and for tracking said object within the service location and for controlling the capture of audio and video of an interaction associated with said object.

26. The apparatus of claim 24 wherein the object location and microphone controller unit comprises a service location file, a camera location file and a microphone location file.

27. The apparatus of claim 24 wherein the object location and microphone controller unit comprises a camera controller for controlling said cameras, a microphone controller for controlling said microphone, and a microphone selector to select a microphone located adjacent or within the service location.

28. The apparatus of claim 1 further comprising a screen capture and storage component for capturing and storing screen shots or screen events associated with the face-to-face interactions, the screen capture and storage component being a screen-event-triggered application running on a computer of the agent participating in the face-to-face interaction.

29. The apparatus of claim 1 further comprising an audio content analyzer for applying voice recognition for identifying the at least one customer or a customer service representative.

30. The apparatus of claim 1 wherein the quality management system combines an automatic score assigned to the agent based on the face-to-face interaction and a manual score assigned to the agent based on the face to face interaction by the team-leader or supervisor.

31. A method for metadata gathering and quality management of face-to-face interactions between an agent and at least one customer in walk-in environments, the method comprising:

determining the beginning and ending of an interaction associated with a substantially fully captured face-to-face interaction of an at least one customer;

generating and storing data or metadata information associated with the face-to-face interaction, thus obtaining a stored face-to-face interaction; and performing a quality management step by receiving input from a human team-leader or supervisor filling an evaluation form by using an application, for evaluating the performance of the agent by the team-leader or the supervisor, from the stored face-to-face interaction, for enhancing an at least one service suggested to the at least one customer, or for getting information about the at least one customer's satisfaction, or for proposing a quality management solution.

32. The method of claim 31 further comprises the steps of:
obtaining interaction audio by an at least one microphone;
generating digital signals or analog signals representing the interaction audio;
feeding the digital signals or analog signals representing the interaction audio to a telephone line;
detecting an on-hook state and an off-hook state of a telephone handset associated with the telephone line by an active unit installed between the at least one microphone and the telephone line; and
relaying the digital signals or analog signals from the active unit through the telephone line to a voice capture and storage unit.

33. The method of claim 32 wherein the voice capture and voice storage is triggered by a voice operated switch associated with the voice capture and storage unit.

34. The method of claim 32 further comprises the steps of:
converting the analog signals representing interaction audio to digital signals by a digital unit connecting between the at least one microphone and the telephone line;
transmitting the converted digital signals to the telephone line in a pre-defined time slot; when the telephone handset associated with the telephone line in an on-hook state.

35. The method of claim 34 further comprises the step of discarding the converted digital signals or mixing the converted digital signals with digital signals from the telephone handset when the telephone handset associated with the telephone line is in an off-hook state.

36. The method of claim 31 further comprises the steps of:
obtaining a list of physical service positions associated with an at least one camera;
selecting an at least one not in use and not out of order camera for the required record-on-demand task;
loading pan-tilt-zoom parameters pertaining to the physical service position; and
re-directing spatially the view of the camera to the physical service position by the operation of the pan-tilt-zoom adjustment actuators.

37. The method of claim 36 further comprises the steps of:
locating and selecting an in-use camera suitable for the performance of the recording-on-demand; and
re-directing the view of the located camera toward the required physical service position through the operation of the pan-tilt-zoom adjustment actuators.

38. The method of claim 31 further comprises the steps of:
relaying signals representing interaction data from an at least one interaction input device to a frequency division multiplexing unit; and
multiplexing the signals representing interaction data into a combined signal wherein signals associated with a specific interaction input device are characterized by being modulated into a pre-defined frequency band.

39. The method of claim 38 further comprises the step of relaying signals representing interaction video from at least one camera via at least one input channel into a processing unit.

40. The method of claim 31 further comprises the steps of:
searching a pre-recorded voice sample bank for the presence of a pre-recorded voice sample matching the interaction participant voice sample;
matching the pre-recorded voice sample to the interaction participant voice sample; and
obtaining details of the interaction participant associated with the pre-recorded voice sample.

41. The method of claim 40 further comprises the step of sampling interaction audio obtained by at least one microphone to obtain an interaction participant voice sample.

42. The method of claim 40 wherein the voice sample bank is generated dynamically during the performance of an interaction consequent to the extraction of interaction audio associated with the interaction participant and by the integration of interaction participant-specific customer relationship management information.

43. The method of claim 31 further comprises the steps of:
detecting the presence and the absence of an interaction participant at a service location; and
submitting a command to begin an interaction recording in accordance with the presence or absence of the interaction participant.

44. The method of claim 31 further comprises the steps of:
receiving a captured stream of interaction audio;
identifying verbal phrases or words where the phrases and the words are characterized by the location thereof in the beginning portion of an interaction;
identifying verbal phrases or words where the phrases and the words are characterized by the location thereof in the terminating portion of an interaction;
segmenting the recorded stream of the interaction audio into distinct separate identifiable interactions based on the characteristics of the identified verbal phrases.

45. The method of claim 31 further comprises the step of:
identifying an interaction participant by determining who is the customer service representative from a previously provided voice file and the customer as the non-customer service representation or from the content of the interaction;
generating a digital representation of the voice of the interaction participant; and
eliminating ambient noise from the interaction recording consequent to the selective separation of the identified interaction participant voice.

46. The method claim 31 further comprises the steps of:
locating an object in an interaction location space by an at least one camera;
tracking the located object in the interaction location space by the at least one camera; and
generating microphone activation commands for an at least one microphone based on the tracked object location data provided by the at least one camera.

47. The method of claim 31 further comprising the step of capturing and storing screen shots or screen events associated with the face-to-face interaction, by an application being a screen-event-triggered application running on a computer of the agent participating in the substantially full face to face interaction.

48. The method of claim 47 wherein one of the screen shots or screen events is used in determining the beginning or ending of the face-to-face interaction.

49. The method of claim 31 wherein the ending of a interaction is determined after a wrap-up time of the face-to-face interaction.

50. The method of claim 31 wherein the beginning of a face-to-face interaction is determined by a customer service representative's login into a network.

51. The method of claim 31 wherein the beginning or ending of a face-to-face interaction is determined by identifying the customer's voice or a customer service representative's voice.

52. The method of claim 31 wherein the quality management step combines an automatic score assigned to the agent based on the face-to-face interaction and a manual score assigned to the agent based on the face to face interaction by the team-leader or supervisor.

* * * * *